US012746921B2

(12) United States Patent
Misri et al.

(10) Patent No.: US 12,746,921 B2
(45) Date of Patent: Sep. 29, 2026

(54) TRAINING AND TESTING A MACHINE LEARNING PROCESS

(71) Applicant: AUTOBRAINS TECHNOLOGIES LTD, Tel Aviv-Jaffa (IL)

(72) Inventors: Isaac Misri, Tel-Aviv (IL); Armin Biess, Tel-Aviv (IL); Julius Engelsoy, Tel-Aviv (IL); Igal Raichelgauz, Tel Aviv (IL)

(73) Assignee: AUTOBRAINS TECHNOLOGIES LTD., Tel Aviv (IL)

( * ) Notice: Subject to any disclaimer, the term of this patent is extended or adjusted under 35 U.S.C. 154(b) by 483 days.

(21) Appl. No.: 18/510,591

(22) Filed: Nov. 15, 2023

(65) Prior Publication Data

US 2024/0083431 A1 Mar. 14, 2024

Related U.S. Application Data

(63) Continuation-in-part of application No. 18/355,324, filed on Jul. 19, 2023, which is a continuation-in-part of application No. 17/823,069, filed on Aug. 29, 2022.

(60) Provisional application No. 63/383,913, filed on Nov. 15, 2022, provisional application No. 63/373,454, filed on Aug. 24, 2022, provisional application No. 63/368,874, filed on Jul. 19, 2022, provisional application No. 63/260,839, filed on Sep. 1, 2021.

(51) Int. Cl.
*B60W 30/16* (2020.01)
*B60W 30/165* (2020.01)
*G06F 11/3668* (2025.01)
*G06N 5/045* (2023.01)

(52) U.S. Cl.
CPC ....... *B60W 30/165* (2013.01); *G06F 11/3688* (2013.01)

(58) Field of Classification Search
CPC . B60W 30/16; B60W 30/165; G06F 11/3688; G06N 3/0455; G06N 3/0464; G06N 3/084; G06N 3/092; G06N 5/045
USPC ...................... 706/12, 16, 15, 25, 13, 45, 62
See application file for complete search history.

(56) References Cited

U.S. PATENT DOCUMENTS

| | | | | |
|---|---|---|---|---|
| 2018/0370502 | A1* | 12/2018 | Wang | B60T 7/22 |
| 2020/0210777 | A1* | 7/2020 | Valois | G06N 3/084 |
| 2020/0410254 | A1* | 12/2020 | Pham | G06T 7/11 |

* cited by examiner

*Primary Examiner* — Daquan Zhao
(74) *Attorney, Agent, or Firm* — RECHES PATENTS

(57) ABSTRACT

A method for training and testing a machine learning process, the method includes (a) learning virtual fields based on simulations of behaviors of a vehicle when faced with situations involving objects within environments of the vehicle, the virtual fields represent potential impacts of objects on the behaviors of the vehicle, wherein the learning is based on a virtual physical mode; (b) training the machine learning process to generate the virtual fields by applying a training process that uses outcomes of the simulations to provide a trained machine learning process; and (c) testing the trained machine learning process by feeding the trained machine learning process with other situations to provide test results.

20 Claims, 29 Drawing Sheets

1033

250

600

700

800

900

3000

3091

3093

3095

4100

4401

4500

TRAINING AND TESTING A MACHINE LEARNING PROCESS

CROSS REFERENCE

This application is a continuation in part of U.S. patent application Ser. No. 18/355,324 filing date Jul. 19, 2023, which is a continuation in part of U.S. patent application Ser. No. 17/823,069 filing date Aug. 29, 2022, that claims priority from U.S. provisional application 63/260,839 which is incorporated herein by reference. U.S. patent application Ser. No. 18/355,324 claims priority from U.S. provisional patent Ser. No. 63/368,874 filing date Jul. 17, 2022, which is incorporated herein in its entirety. U.S. patent application Ser. No. 18/355,324 claims priority from U.S. provisional patent Ser. No. 63/373,454 filing date Aug. 24, 2022, which is incorporated herein in its entirety.

This application claims priority from U.S. provisional patent 63/383,913 filing date Nov. 15, 2023 which is incorporated herein by reference.

This application claims priority from U.S. provisional patent 63/383,912 filing date Nov. 15, 2023 which is incorporated herein by reference.

BACKGROUND

Autonomous driving (AVs) and advanced driving assistance systems (ADAS) operations can be based on machine learning processes.

The accuracy of these machine learning processes is dependent on the datasets fed to the machine learning process during training.

It has been found that when training the network based solely on information regarding actual situations that were recorded, may limit the accuracy of the machine learning process.

There is a growing need to determine how a AV or ADAS system responds to unknown scenarios.

SUMMARY

Methods, systems and non-transitory computer readable medium as illustrated in the specification and/or drawings and/or claims.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
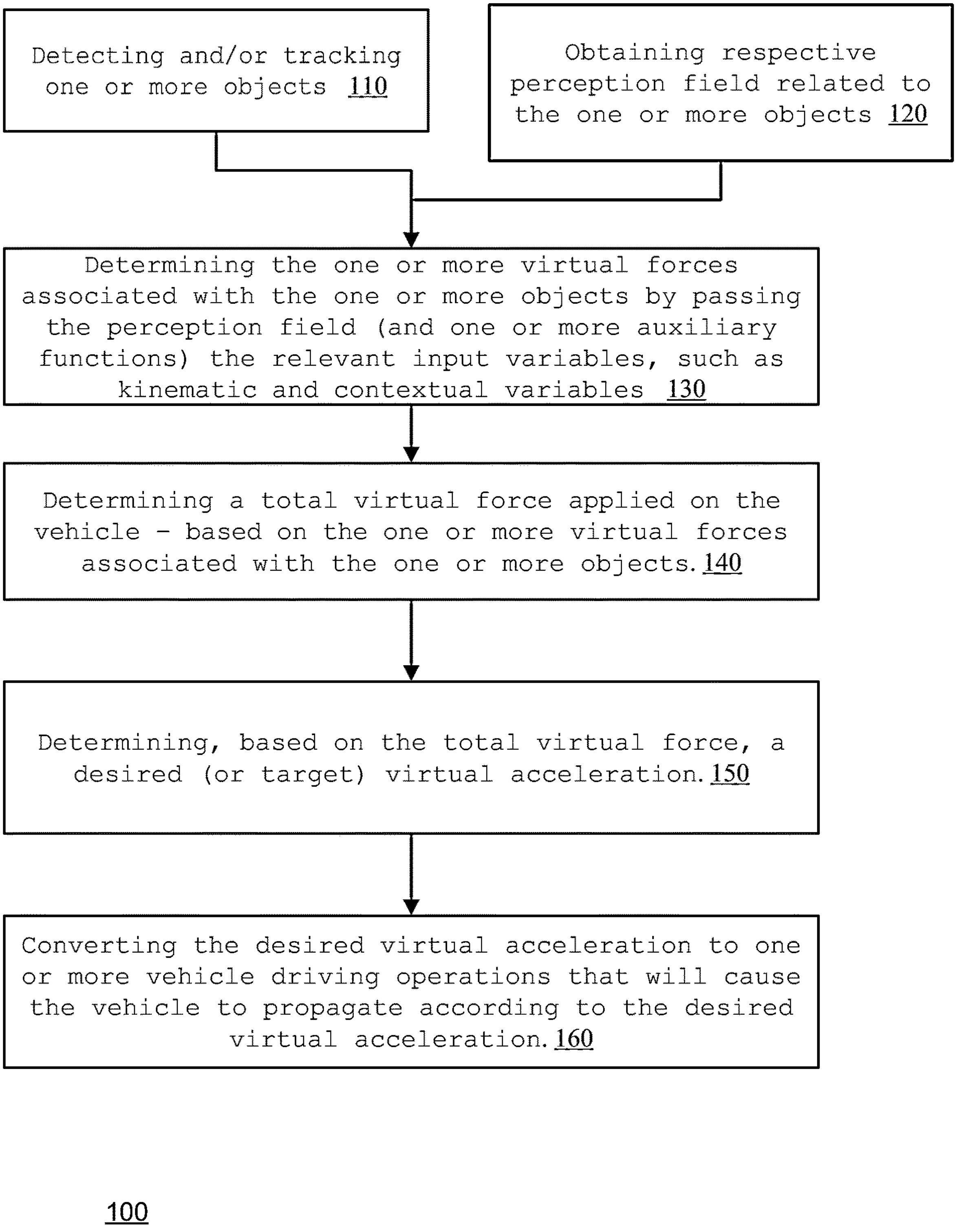
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the FIGURES have not necessarily been drawn to scale. For example, the dimensions of some of the elements may be exaggerated relative to other elements for clarity. Further, where considered appropriate, reference numerals may be repeated among the FIGURES to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the FIGURES, any part of the specification and/or any claims may be provided.

Any one of the units and/or modules that are illustrated in the application, may be implemented in hardware and/or code, instructions and/or commands stored in a non-transitory computer readable medium, may be included in a vehicle, outside a vehicle, in a mobile device, in a server, and the like.

The vehicle may be any type of vehicle—for example a ground transportation vehicle, an airborne vehicle, or a water vessel.

The specification and/or drawings may refer to an image. An image is an example of a media unit. Any reference to an image may be applied mutatis mutandis to a media unit. A media unit may be an example of sensed information unit (SIU). Any reference to a media unit may be applied mutatis mutandis to any type of natural signal such as but not limited to signal generated by nature, signal representing human behavior, signal representing operations related to the stock market, a medical signal, financial series, geodetic signals, geophysical, chemical, molecular, textual and numerical signals, time series, and the like. Any reference to a media unit may be applied mutatis mutandis to a sensed information unit (SIU). The SIU may be of any kind and may be sensed by any type of sensors—such as a visual light camera, an audio sensor, a sensor that may sense infrared, radar imagery, ultrasound, electro-optics, radiography, LIDAR (light detection and ranging), a thermal sensor, a passive sensor, an active sensor, etc. The sensing may include generating samples (for example, pixel, audio signals) that represent the signal that was transmitted, or otherwise reach the sensor. The SIU may be one or more images, one or more video clips, textual information regarding the one or more images, text describing kinematic information about an object, and the like.

Object information may include any type of information related to an object such as but not limited to a location of the object, a behavior of the object, a velocity of the object, an acceleration of the object, a direction of a propagation of the object, a type of the object, one or more dimensions of the object, and the like. The object information may be a raw SIU, a processed SIU, text information, information derived from the SIU, and the like.

An obtaining of object information may include receiving the object information, generating the object information, participating in a processing of the object information, processing only a part of the object information and/or receiving only another part of the object information.

The obtaining of the object information may include object detection or may be executed without performing object detection.

A processing of the object information may include at least one out of object detection, noise reduction, improvement of signal to noise ratio, defining bounding boxes, and the like.

The object information may be received from one or more sources such as one or more sensors, one or more communication units, one or more memory units, one or more image processors, and the like.

The object information may be provided in one or more manners—for example in an absolute manner (for example—providing the coordinates of a location of an object), or in a relative manner—for example in relation to a vehicle (for example the object is located at a certain distance and at a certain angle in relation to the vehicle.

The vehicle is also referred to as an ego-vehicle.

The specification and/or drawings may refer to a processor or to a processing circuitry. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. Alternatively, the examples may be implemented as any number of separate integrated circuits or separate devices interconnected with each other in a suitable manner.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly—any reference to object detection is applicable mutatis mutandis to a pattern detection.

Although successful driving is contingent upon circumnavigating surrounding road objects based on their location and movement, humans are notoriously bad at estimating kinematics. We suspect that humans employ an internal representation of surrounding objects in the form of virtual force fields that immediately imply action, thus circumventing the need for kinematics estimation. Consider a scenario in which the ego vehicle drives in one lane and a vehicle diagonally in front in an adjacent lane starts swerving into the ego lane. The human response to brake or veer off would be immediate and instinctive and can be experienced as a virtual force repelling the ego from the swerving vehicle. This virtual force representation is learned and associated with the specific road object.

Inspired by the above considerations we propose the novel concept of perception fields. Perception fields are a learned representation of road objects in the form of a virtual force field that is "sensed" through the control system of the ego vehicle in the form of ADAS and/or AV software. A field is here defined as a mathematical function which depends on spatial position (or an analogous quantity)

An example of an inference method 100 is illustrates in FIG. 1 and include:

Method 100 may be executed per one or more frames of an environment of the vehicle.

Step 110 of method 100 may include detecting and/or tracking one or more objects (including, for example, one or more road users). The detecting and/or tracking may be done in any manner. The one or more objects may be any object that may affect the behavior of the vehicle. For example—a road user (pedestrian, another vehicle), the road and/or path on which the vehicle is progressing (for example the state of the road or path, the shape of the road—for example a curve, a straight road segments), traffic signs, traffic light, road crossings, a school, a kindergarten, and the like. Step 110 may include obtaining additional information such as kinematic and contextual variables related to the one or more objects. The obtaining may include receiving or generating. The obtaining may include processing the one or more frames to generate the kinematic and contextual variables.

It should be noted that step 110 may include obtaining the kinematic variables (even without obtaining the one or more frames).

Method 100 may also include step 120 of obtaining respective perception field related to the one or more objects. Step 120 may include determining which mapping between objects and should be retrieved and/or used, and the like.

Step 110 (and even step 120) may be followed by step 130 of determining the one or more virtual forces associated with the one or more objects by passing the perception field (and one or more virtual physical model functions) the relevant input variables, such as kinematic and contextual variables.

Step 130 may be followed by step 140 of determining a total virtual force applied on the vehicle—based on the one or more virtual forces associated with the one or more objects. For example—step 140 may include performing a vector weighted sum (or other function) on the one or more virtual forces associated with the one or more objects.

Step 140 may be followed by step 150 of determining, based on the total virtual force, a desired (or target) virtual acceleration—for example based on the equivalent of Newton's second law. The desired virtual acceleration may be a vector—or otherwise have a direction.

Step 150 may be followed by step 160 of converting the desired virtual acceleration to one or more vehicle driving operations that will cause the vehicle to propagate according to the desired virtual acceleration.

For example—step 160 may include translating the desired acceleration to acceleration or deceleration or changing direction of progress of the vehicle—using gas pedal movement, brake pedal movement and/or steering wheel angle. The translation may be based on a dynamics model of the vehicle with a certain control scheme.

The advantages of perception fields include, for example—explainability, generalizability and a robustness to noisy input.

Explainability. Representing ego movement as the composition of individual perception fields implies decomposing actions into more fundamental components and is in itself a significant step towards explainability. The possibility to visualize these fields and to apply intuition from physics in order to predict ego motion represent further explainability as compared to common end-to-end, black-box deep learning approaches. This increased transparency also leads to passengers and drivers being able to trust AV or ADAS technology more.

Generalizability. Representing ego reactions to unknown road objects as repellent virtual force fields constitutes an inductive bias in unseen situations. There is a potential advantage to this representation in that it can handle edge cases in a safe way with less training. Furthermore, the perception field model is holistic in the sense that the same approach can be used for all aspects of the driving policy. It can also be divided into narrow driving functions to be used in ADAS such as ACC, AEB, LCA etc. Lastly, the composite nature of perception fields allows the model to be trained on atomic scenarios and still be able to properly handle more complicated scenarios.

Robustness to noisy input: Physical constraints on the time evolution of perception fields in combination with potential filtering of inputs may lead to better handling of noise in the input data as compared to pure filtering of localization and kinematic data.

Physical or virtual forces allow for a mathematical formulation—for example—in terms of a second order ordinary differential equation comprising a so called dynamical system. The benefits of representing a control policy as such is that it is susceptible to intuition from the theory of dynamical systems and it is a simple matter to incorporate external modules such as prediction, navigation, and filtering of in-puts/outputs.

An additional benefit to the perception field approach is that it is not dependent on any specific hardware, and not computationally more expensive than existing methods.

Training Process

The process for learning perception fields can be of one of two types or a combination thereof, namely behavioral cloning (BC) and reinforcement learning (RL). BC approximates the control policy by fitting a neural network to observed human state-action pairs whereas RL entails learning by trial and error in a simulation environment without reference to expert demonstrations.

One can combine these two classes of learning algorithms by first learning a policy through BC to use it as an initial policy to be fine-tuned using RL. Another way to combine the two approaches is to first learn the so called reward function (to be used in RL) through behavioral cloning to infer what constitutes desirable behavior to humans, and later to train through trial and error using regular RL. This latter approach goes under the name of inverse RL (IRL).

Figure 2:
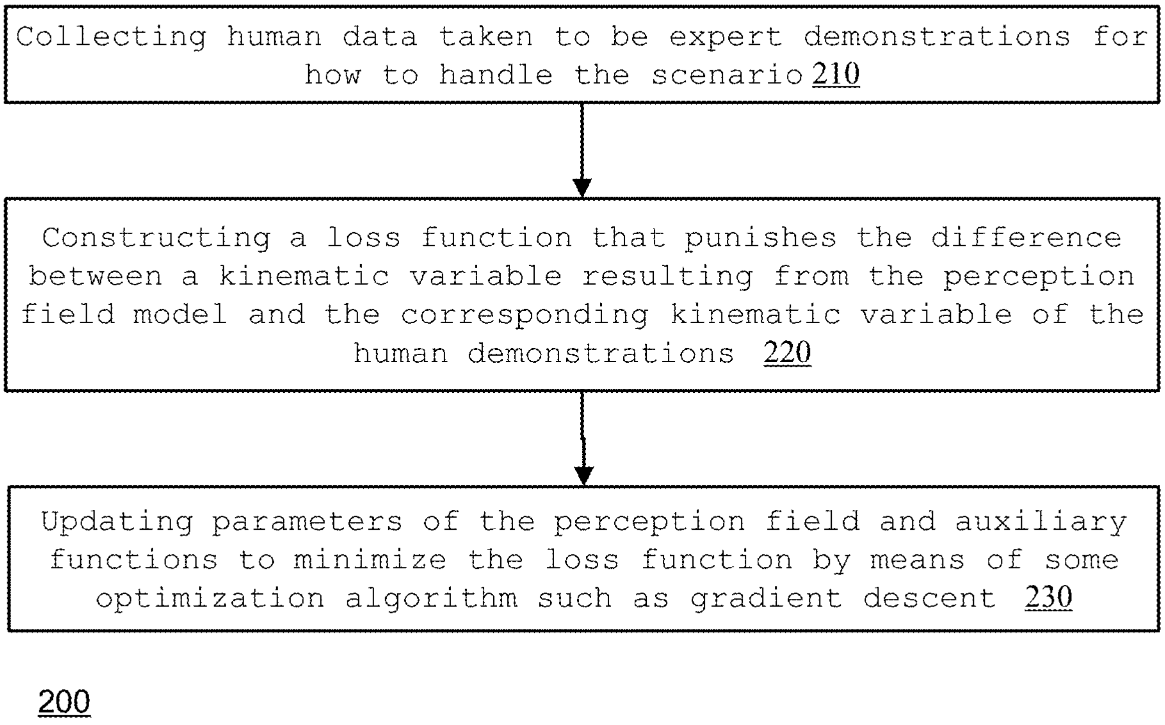
FIG. 2 illustrates an example of a method.

FIG. 2 is an example of a training method 200 employed for learning through BC.

Method 200 may start by step 210 of collecting human data taken to be expert demonstrations for how to handle the scenario.

Step 210 may be followed by step 220 of constructing a loss function that punishes the difference between a kinematic variable resulting from the perception field model and the corresponding kinematic variable of the human demonstrations.

Step 220 may be followed by step 230 of updating parameters of the perception field and auxiliary functions (that may be virtual physical model functions that differ from perception fields) to minimize the loss function by means of some optimization algorithm such as gradient descent.

Figure 3:
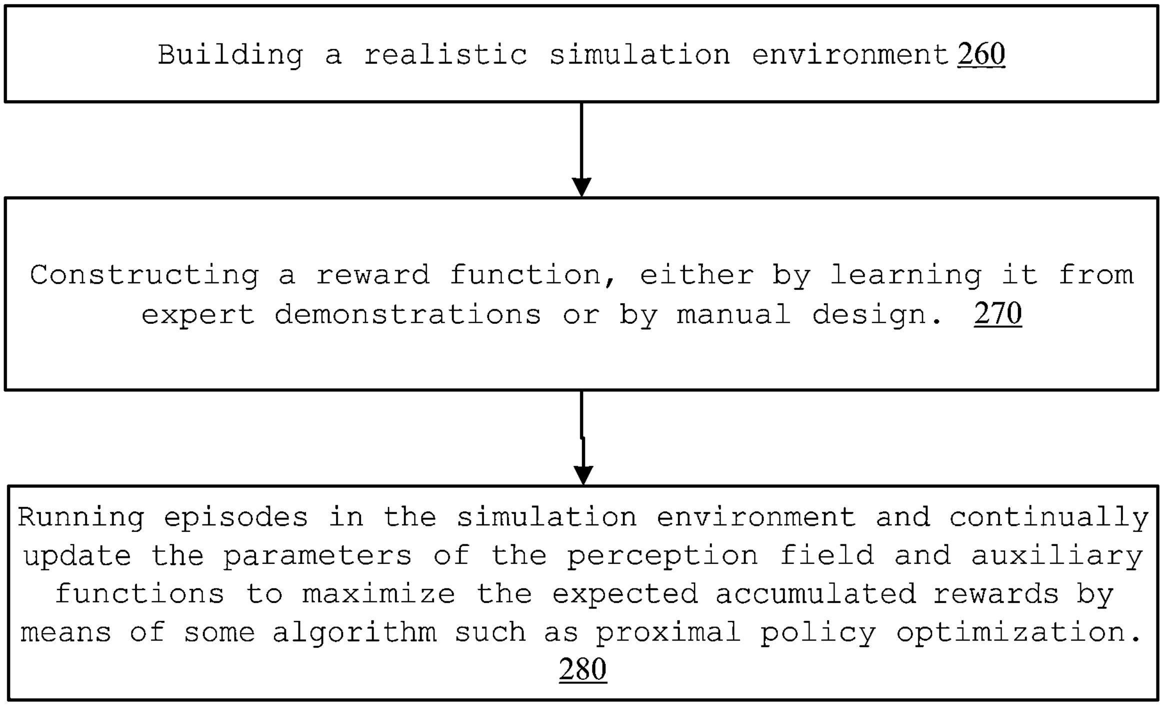
FIG. 3 illustrates an example of a method.

FIG. 3 is an example of a training method 250 employed for reinforcement learning.

Method 250 may start by step 260 of building a realistic simulation environment.

Step 260 may be followed by step 270 of constructing a reward function, either by learning it from expert demonstrations or by manual design.

Step 270 may be followed by step 280 of running episodes in the simulation environment and continually update the parameters of the perception field and auxiliary functions to maximize the expected accumulated rewards by means of some algorithm such as proximal policy optimization.

Figure 4:
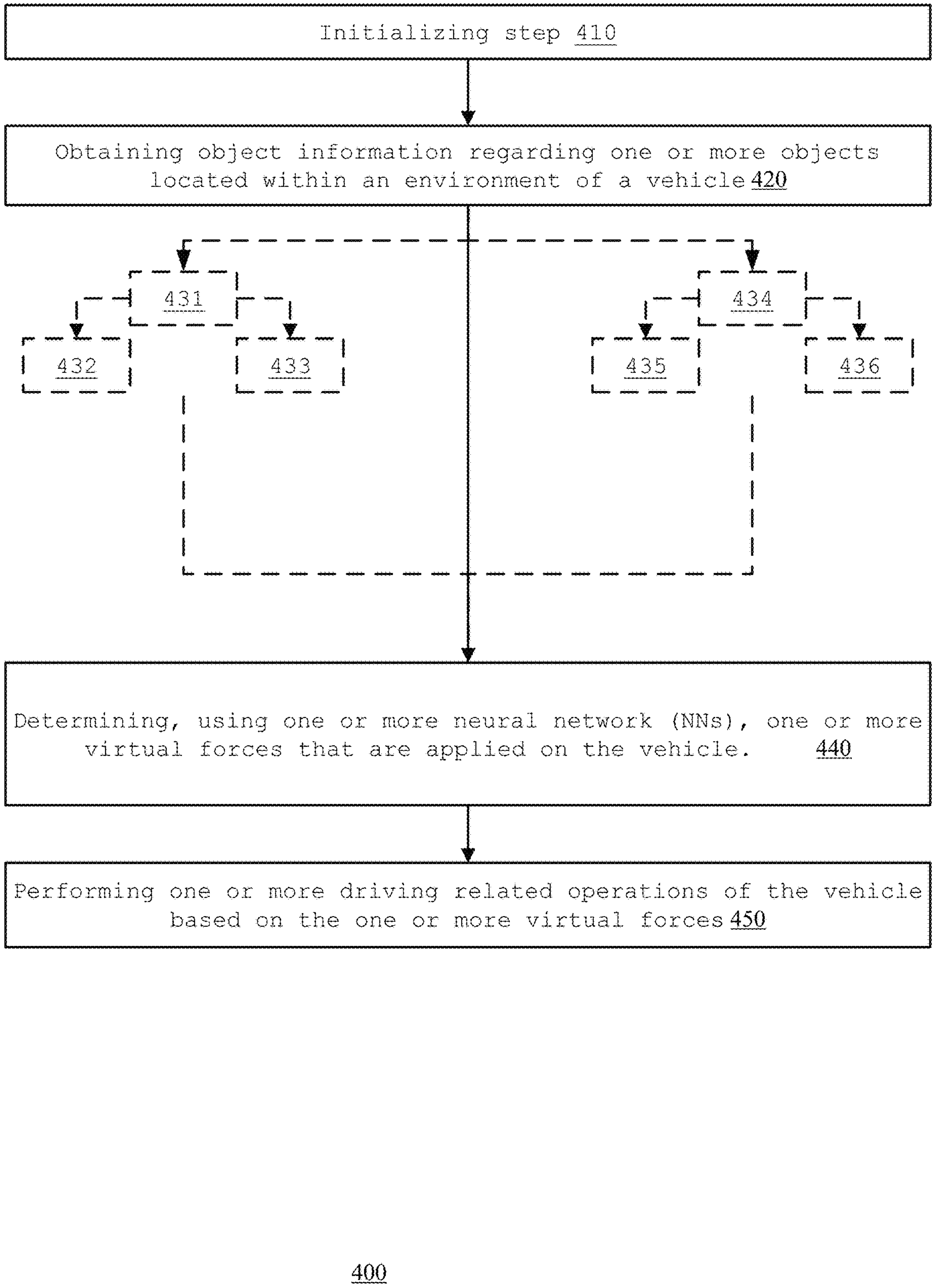
FIG. 4 illustrates an example of a method.

FIG. 4 illustrates an example of method 400.

Method 400 may be for perception fields driving related operations.

Method 400 may start by initializing step 410.

Initializing step 410 may include receiving a group of NNs that are trained to execute step 440 of method 400.

Alternatively, step 410 may include training a group of NNs that to execute step 440 of method 400.

Various example of training the group of NNs are provided below.

a. The group of NNs may be trained to map the object information to the one or more virtual forces using behavioral cloning.
b. The group of NNs may be trained to map the object information to the one or more virtual forces using reinforcement learning.
c. The group of NNs may be trained to map the object information to the one or more virtual forces using a combination of reinforcement learning and behavioral cloning.
d. The group of NNs may be trained to map the object information to the one or more virtual forces using a reinforcement learning that has a reward function that is defined using behavioral cloning.
e. The group of NNs may be trained to map the object information to the one or more virtual forces using a reinforcement learning that has an initial policy that is defined using behavioral cloning.

f. The group of NNs may be trained to map the object information to the one or more virtual forces and one or more virtual physical model functions that differ from the perception fields.

g. The group of NN may include a first NN and a second NN, wherein the first NN is trained to map the object information to the one or more perception fields and the second NN was trained to map the object information to the one or more virtual physical model functions.

Initializing step 410 may be followed by step 420 of obtaining object information regarding one or more objects located within an environment of a vehicle. Step 410 may be repeated multiple times—and the following steps may also be repeated multiple times. The object information may include video, images, audio, or any other sensed information.

Step 420 may be followed by step 440 of determining, using one or more neural network (NNs), one or more virtual forces that are applied on the vehicle.

The one or more NNs may be the entire group of NNs (from initialization step 410) or may be only a part of the group of NNs—leaving one or more non-selected NNs of the group.

The one or more virtual forces represent one or more impacts of the one or more objects on a behavior of the vehicle. The impact may be a future impact or a current impact. The impact may cause the vehicle to change its progress.

The one or more virtual forces belong to a virtual physical model. The virtual physical model is a virtual model that may virtually apply rules of physics (for example mechanical rules, electromagnetic rules, optical rules) on the vehicle and/or the objects.

Step 440 may include at least one of the following steps:

a. Calculating, based on the one or more virtual forces applied on the vehicle, a total virtual force that is applied on the vehicle.

b. Determining a desired virtual acceleration of the vehicle based on an total virtual acceleration that is applied on the vehicle by the total virtual force. The desired virtual acceleration may equal the total virtual acceleration—or may differ from it.

Method 400 may also include at least one of steps 431, 432, 433, 434, 435 and 436.

Step 431 may include determining a situation of the vehicle, based on the object information.

Step 431 may be followed by step 432 of selecting the one or more NNs based on the situation.

Additionally or alternatively, step 431 may be followed by step 433 of feeding the one or more NNs with situation metadata.

Step 434 may include detecting a class of each one of the one or more objects, based on the object information.

Step 434 may be followed by step 435 of selecting the one or more NNs based on a class of at least one object of the one or more objects.

Additionally or alternatively, step 434 may be followed by step 436 of feeding the one or more NNs with class metadata indicative of a class of at least one object of the one or more objects.

Step 440 may be followed by step 450 of performing one or more driving related operations of the vehicle based on the one or more virtual forces.

Step 450 may be executed without human driver intervention and may include changing the speed and/or acceleration and/or the direction of progress of the vehicle. This may include performing autonomous driving or performing advanced driver assistance system (ADAS) driving operations that may include momentarily taking control over the vehicle and/or over one or more driving related units of the vehicle. This may include setting, without or without human driver involvement, an acceleration of the vehicle to the desired virtual acceleration.

Step 440 may include suggesting to a driver to set an acceleration of the vehicle to the desired virtual acceleration.

Figure 5:
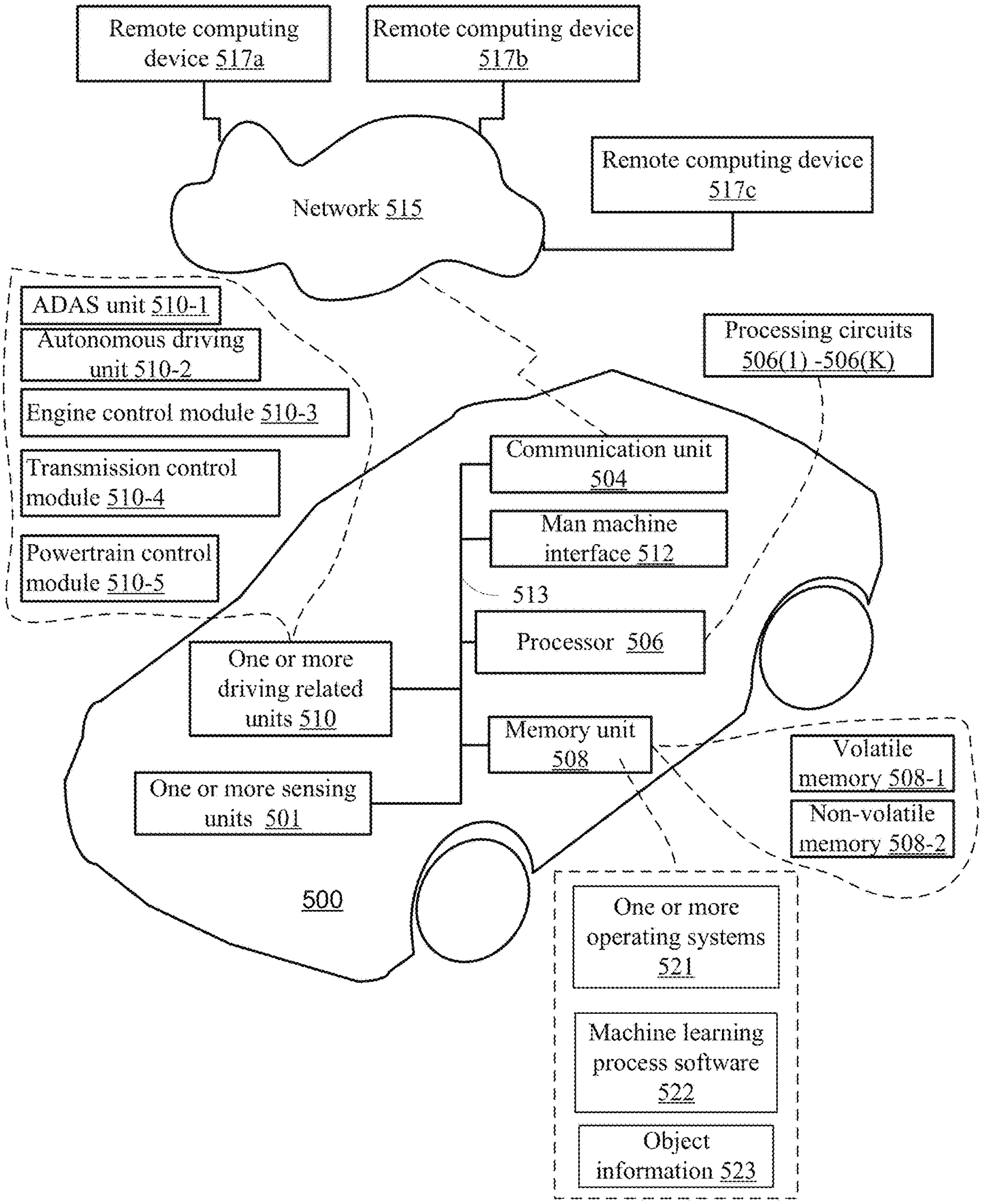
FIG. 5 is an example of a vehicle.

FIG. 5 is an example of a vehicle 500. The vehicle may include one or more sensing units 501, one or more driving related units 510 (such as autonomous driving units, ADAS units, engine control module 510-3, transmission control module 510-4, powertrain control module 510-5, and the like, a processor 560 configured to execute any of the methods, at least one memory unit 508 for storing one or more operating systems 521, object information 523, software such as machine learning process software 522, and/or instructions and/or method results, functions and the like, and a communication unit 504. The processor 506 includes a plurality of processing units 506(1)-506(K), K is an integer that exceeds one. Any reference to one unit or item should be applied mutatis mutandis to multiple units or items. For example—any reference to processor 506 should be applied mutatis mutandis to multiple processors, any reference to memory unit 508 should be applied mutatis mutandis to multiple memory units, any reference to communication unit 504 should be applied mutatis mutandis to multiple communication units.

According to an embodiment, the at least one memory unit 508 includes one or more memory unit, each memory unit may include one or more memory banks.

According to an embodiment, the at least one memory unit includes a volatile memory 508-1 and/or a non-volatile memory 508-2. The memory unit may be a random access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle 500. For example and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory unit.

According to an embodiment, the at least one memory unit stores at least one database—such as any database known in the art—such as DB2®, Microsoft® Access, Microsoft® SQL Server, Oracle®, mySQL, PostgreSQL, and the like.

Various units and/or components are in communication with each other using any communication elements and/or protocols. An example of a communication element is bus 513. Other communication elements may be provided.

FIG. 5 illustrate bus 513 as being in communication with processor 506, man machine interface 512, communication unit 514, one or more driving related units 510, one or more sensing units 501, and memory unit.

Bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems.

FIG. 5 also illustrates network 515 that is located outside the vehicle and is used for communication between the vehicle (especially communication unit 504) and at least one remote computing device 517*a*, 517*b* and 517*c*. By way of example, a remote computing device can be a personal computer, a laptop computer, portable computer, a server, a router, a network computer, a peer device or other common network node, and so on. Logical connections between the processor and either one of remote computing devices 517*a*, 517*b* and 517*c* can be made via a local area network (LAN) and a general wide area network (WAN). Such network connections can be through a network adapter (may belong to communication unit 504) which can be implemented in both wired and wireless environments. Such networking environments are conventional and commonplace in offices, enterprise-wide computer networks, intranets, and a network 515 such as the internet.

Figure 6:
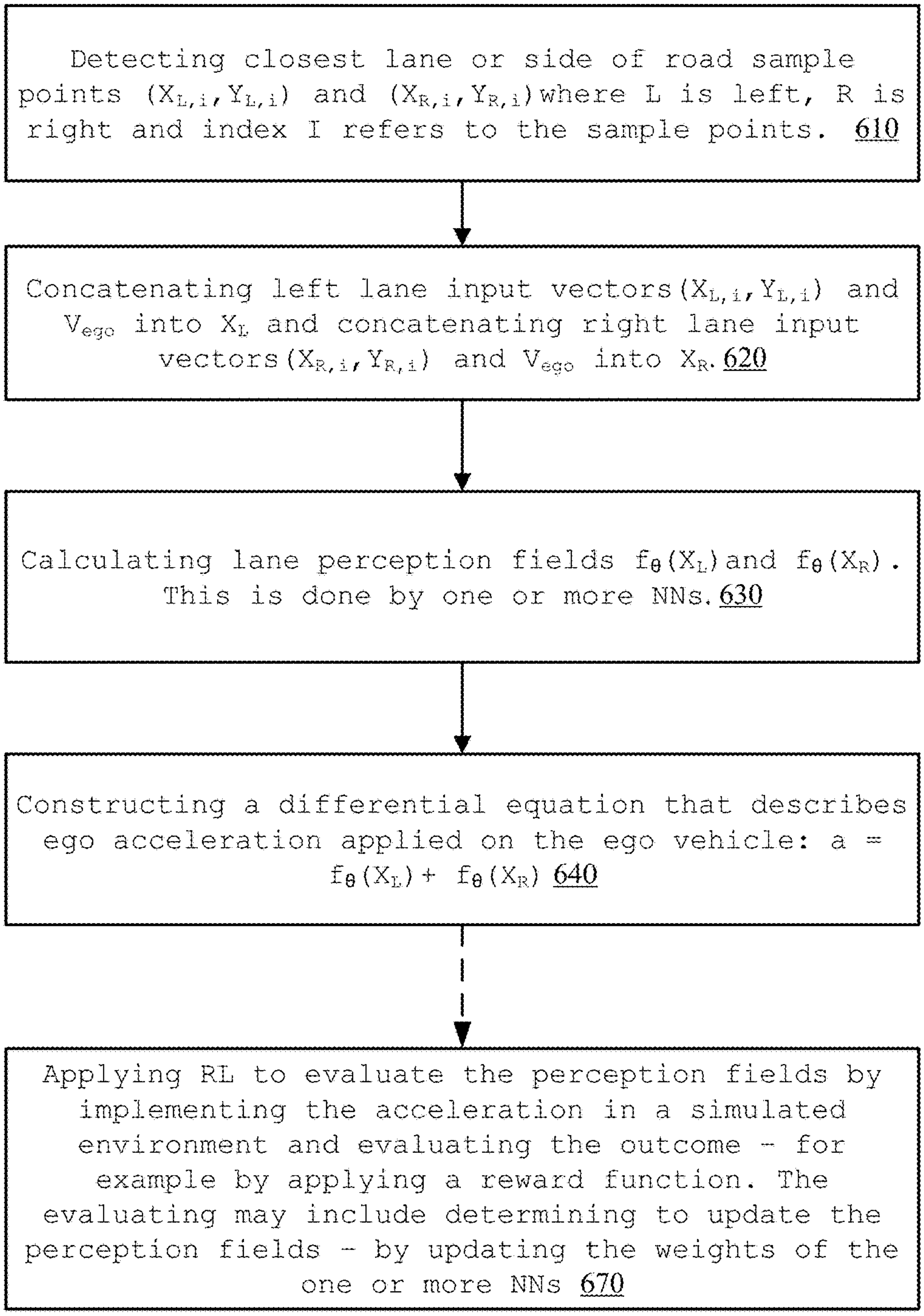
FIGS. 6-9 illustrate examples of situations and of perception fields.

FIG. 6 illustrate examples of a method 600 for lane centering RL with lane sample points as inputs. The lane sample points are located within the environment of the vehicle.

The RL assumes a simulation environment that generates input data in which an agent (ego vehicle) can implement its learned policy (perception fields).

Method 600 may start by step 610 of detecting closest lane or side of road sample points ($X_{L,i}$, $Y_{L,i}$) and ($X_{R,i}$,$Y_{R,i}$) where L is left, R is right and index i refers to the sample points. The velocity of the ego vehicle (previously referred to as the vehicle) is denoted $V_{ego}$.

Step 610 may be followed by step 620 of concentrating left lane input vectors ($X_{L,i}$,$Y_{L,i}$) and $V_{ego}$ into $X_L$ and concentrating right lane input vectors ($X_{R,i}$,$Y_{R,i}$) and $V_{ego}$ into $X_R$.

Step 620 may be followed by step 630 of calculating lane perception fields $f_\theta(X_L)$ and $f_\theta(X_R)$. This is done by one or more NNs.

Step 630 may be followed by step 640 of constructing a differential equation that describes ego acceleration applied on the ego vehicle: $a=f_\theta(X_L)+f_\theta(X_R)$.

This may be the output of the inference process. Step 640 may be followed by step 450 (not shown).

The method may include updating the one or more NNs. In this case the RL may assume a reward function that is either learnt based on expert demonstrations or handcrafted), in the example of FIG. 6 the reward function may increase for every timestamp in which the ego vehicle maintains its lane.

The updating may include step 670 of implementing, in a simulation environment and the RL learning algorithm records what happens in the next time step including the obtaining reward.

Step 670 may include using a specific RL algorithm (for example PPO, SAC, TTD3 to sequentially update the network parameters θ in order to maximize average award.

Figure 7:
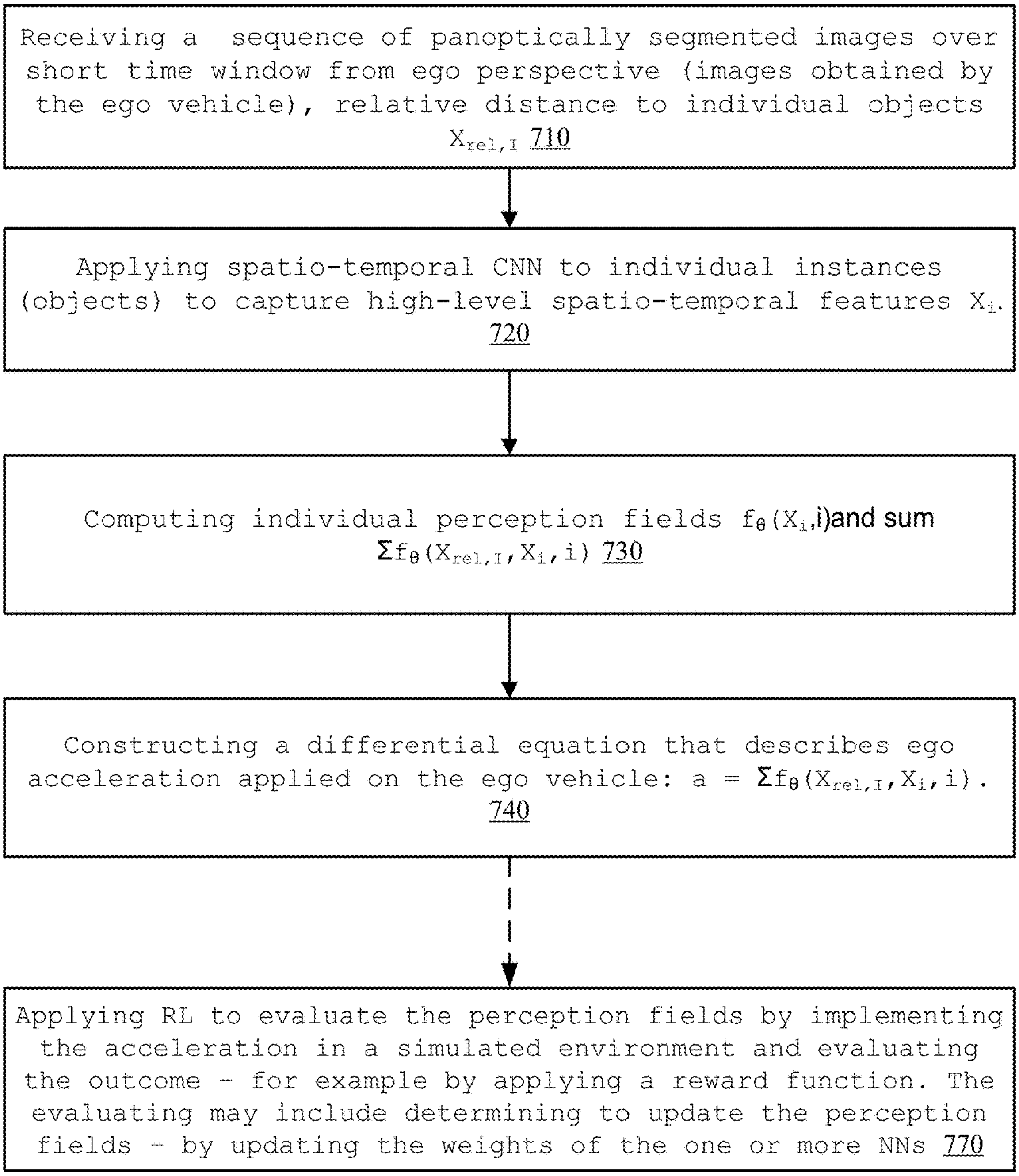

FIG. 7 illustrates method 700 for multi-object RL with visual input.

Step 710 of method 700 may include receiving a sequence of panoptically segmented images over short time window from ego perspective (images obtained by the ego vehicle), relative distance to individual objects $X_{rel,i}$.

Step 710 may be followed by step 720 of applying spatio-temporal CNN to individual instances (objects) to capture high-level spatio-temporal features $X_i$.

Step 720 may be followed by step 730 of computing individual perception fields $f_\theta(X_i,i)$ and sum $\Sigma f_\theta(X_{rel,I},X_i,i)$.

Step 730 may be followed by step 740 of constructing a differential equation that describes ego acceleration applied on the ego vehicle: $a=\Sigma f_\theta(X_{rel,I},X_i,i)$ This may be the output of the inference process. Step 740 may be followed by step 450 (not shown).

The method may include updating the one or more network parameters θ using some RL process.

The method may include step 760 of implementing a in the simulation environment and the RL learning algorithm records what happens in the next time step, including the obtained reward.

The RL may assume a reward function that is either learned based on expert demonstrations or handcrafted.

Step 760 may be followed by step 770 of using specific RL algorithms such as PPO, SAC, TTD3 to sequentially update the network parameters θ in order to maximize average reward.

Figure 8:
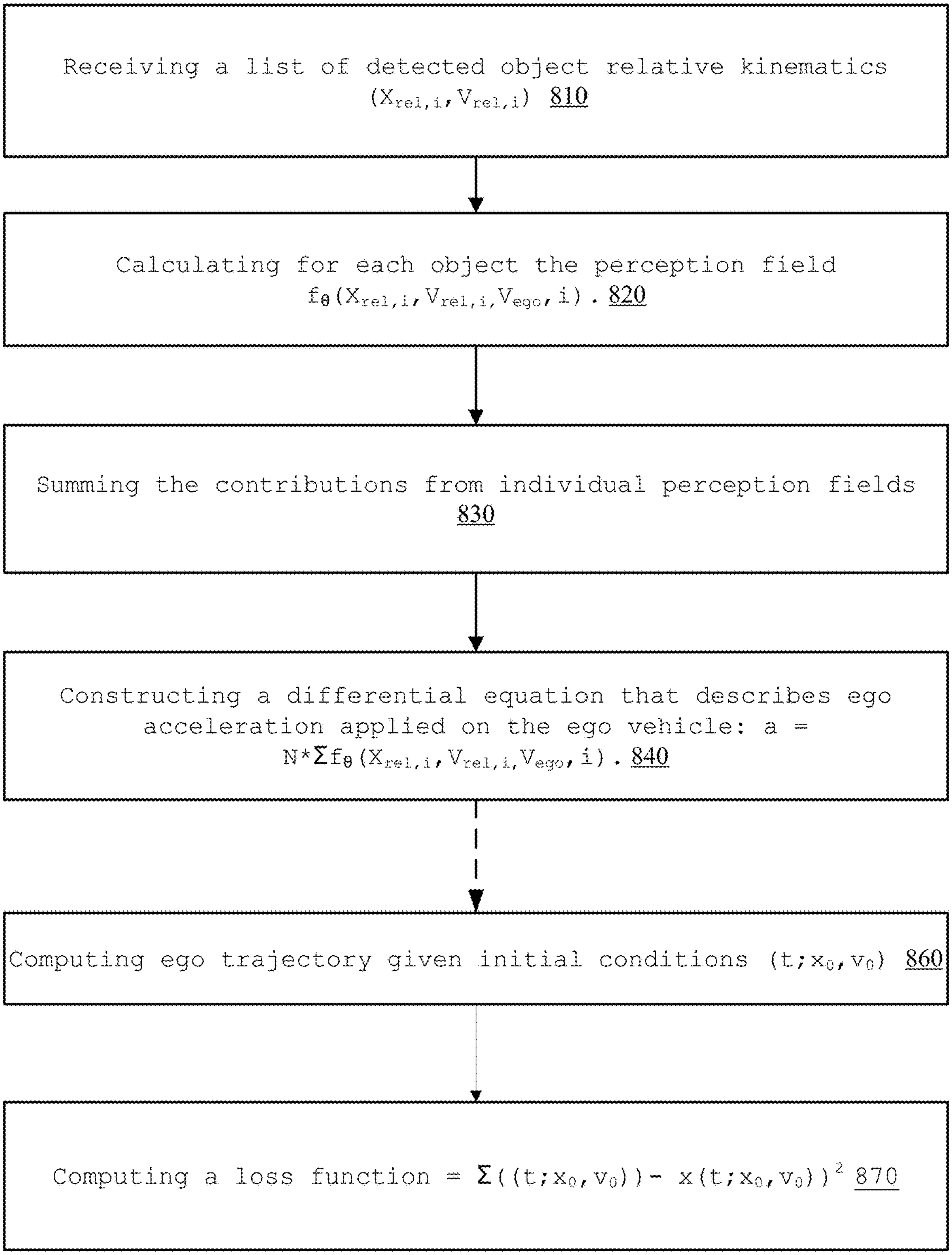

FIG. 8 illustrates method 800 for multi-object BC with kinematics input.

Step 810 of method 800 may include receiving a list of detected object relative kinematics ($X_{rel,i}$,$V_{rel,i}$) wherein $X_{rel,i}$ is a relative location of detected object i—in relation to the ego vehicle and $V_{rel,i}$ is a relative velocity of detected object i—in relation to the ego vehicle. Also receiving the ego vehicle velocity $V_{ego}$.

Step 810 may be followed by step 820 of calculating for each object the perception field $f_\theta(X_{rel,i}, V_{rel,i},V_{ego}, i)$.

Step 820 may be followed by step 830 of summing the contributions from individual perception fields. Step 830 may also include normalizing so that the magnitude of the resulting 2d vector is equal to the highest magnitude of the individual terms: $N^*\Sigma f_\theta(X_{rel,i},V_{rel,i},V_{ego},i)$.

Step 830 may be followed by step 840 of constructing a differential equation that describes ego acceleration applied on the ego vehicle: $a=N^*\Sigma f_\theta(X_{rel,i}, V_{rel,i},V_{ego}, i)$.

This may be the output of the inference process. Step 840 may be followed by step 450 (not shown).

The method may include updating the one or more network parameters.

The method may include step 860 of computing ego trajectory given initial conditions $\hat{X}(t; x_0,v_0)$.

Step 860 may be followed by step 870 of computing a loss function$=\Sigma(\hat{X}(t; x_0,v_0))-x(t; x_0,v_0))^2$. And propagating the loss accordingly.

Figure 9:
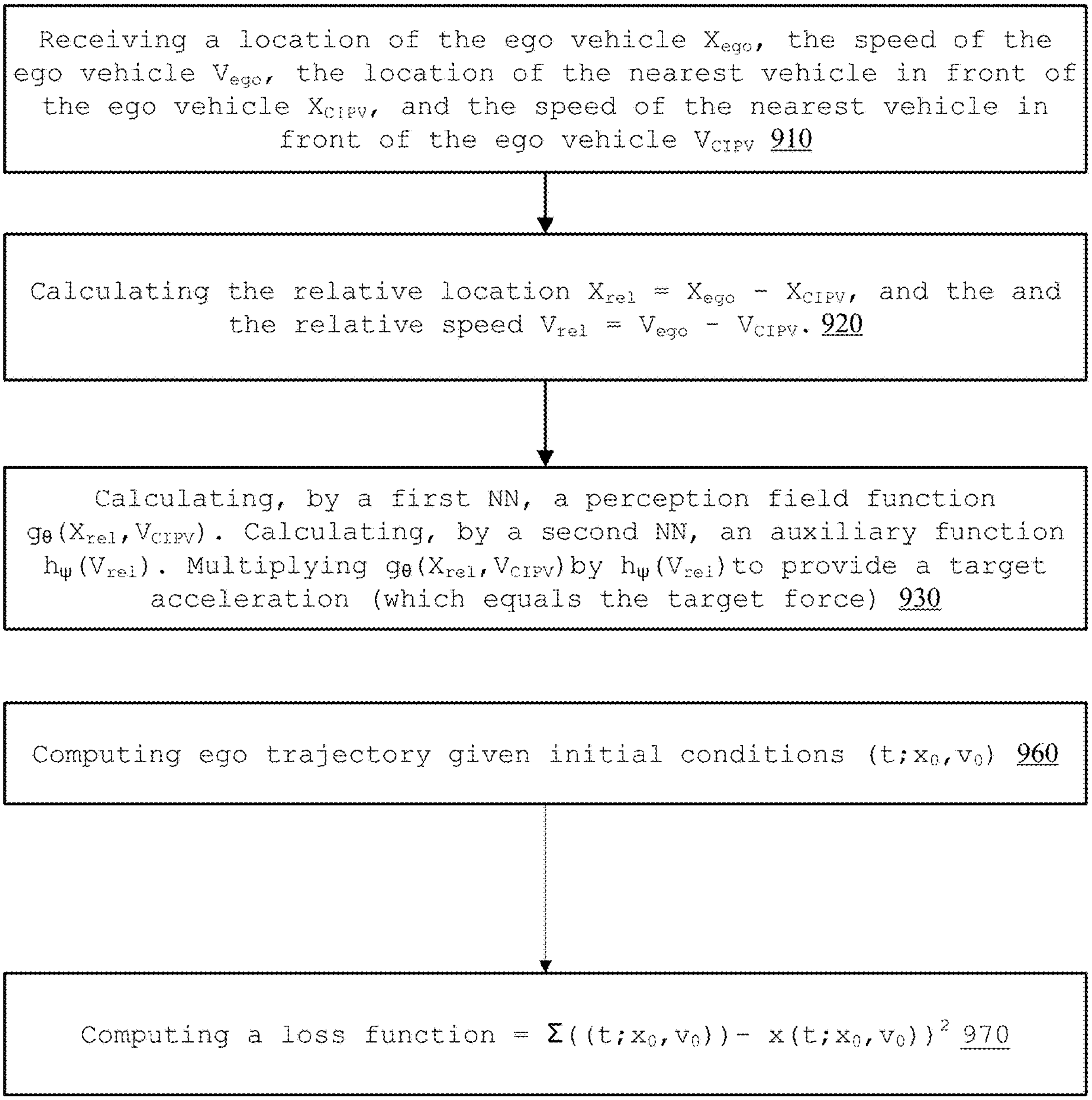

FIG. 9 illustrates method 900 of inference with the addition of a loss function for an adaptive cruise control model implemented with kinematic variables as inputs.

Step 910 of method 900 may include receiving a location of the ego vehicle $X_{ego}$, the speed of the ego vehicle $V_{ego}$, the location of the nearest vehicle in front of the ego vehicle $X_{CIPV}$, and the speed of the nearest vehicle in front of the ego vehicle $V_{CIPV}$.

Step 910 may be followed by step 920 of calculating the relative location $X_{rel}=X_{ego}-X_{CIPV}$, and the and the relative speed $V_{rel}=V_{ego}-V_{CIPV}$.

Step 920 may be followed by step 930 of:

a. Calculating, by a first NN, a perception field function $g_\theta(X_{rel}, V_{CIPV})$ b. Calculating, by a second NN, an auxiliary function $h_\psi(V_{rel})$.

c. Multiplying $g_\theta(X_{rel}, V_{CIPV})$ by $h_\psi(V_{rel})$ to provide a target acceleration (which equals the target force).

This may be the output of the inference process. Step 930 may be followed by step 450 (not shown).

The method may include updating the one or more NN parameters.

The method may include step 960 of computing ego trajectory given initial conditions $\hat{X}(t; x_0, v_0)$.

Step 960 may be followed by step 970 of computing a loss function$=\Sigma(\hat{X}(t; x_0, v_0))-x(t; x_0, v_0))^2$. And propagating the loss accordingly.

Visualization

Perception fields are a novel computational framework to generate driving policies in an autonomous ego-vehicle in different traffic environments (e.g., highway, urban, rural) and for different driving tasks (e.g., collision avoidance, lane keeping, ACC, overtaking, etc). Perception fields are attributes of road objects and encode force fields, which emerge from each road object i of category c (e.g., other vehicles, pedestrians, traffic signs, road boundaries, etc.), and act on the ego vehicle, inducing driving behavior. The key to obtaining desirable driving behavior from a perception field representation of the ego environment is modeling the force fields so that they are general enough to allow for versatile driving behaviors but specific enough to allow for efficient learning using human driving data. The application of perception fields has several advantages over existing methods (e.g., end-to-end approaches), such as task-decomposition and enhanced explainability and generalization capabilities, resulting in versatile driving behavior.

Figure 10:
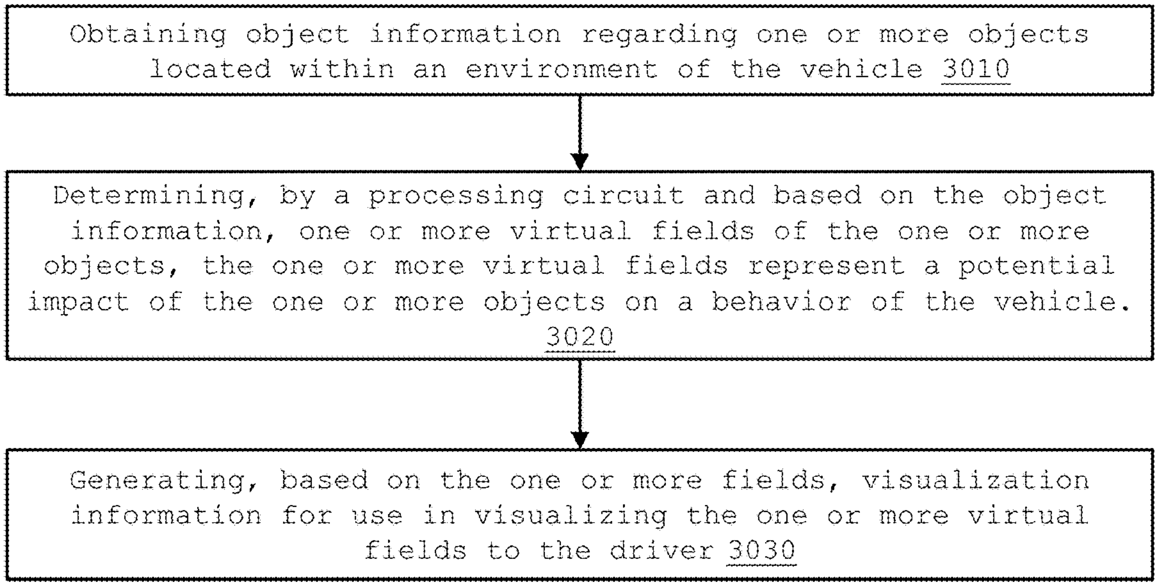
FIG. 10 illustrates an example of a method.

FIG. 10 illustrates an example of a method 3000 for visualization.

According to an embodiment, method 3000 starts by step 3010 of obtaining object information regarding one or more objects located within an environment of the vehicle.

According to an embodiment, step 3010 also includes analyzing the object information. The analysis may include determining location information and/or movement information of the one or more objects. The location information and the movement information may include the relative location of the one or more objects (in relation to the vehicle) and/or the relative movement of the one or more objects (in relation to the vehicle).

According to an embodiment, step 3010 is followed by step 3020 of determining, by a processing circuit and based on the object information, one or more virtual fields of the one or more objects, the one or more virtual fields represent a potential impact of the one or more objects on a behavior of the vehicle.

Step 3020 may be driven from the virtual physical model. For example—assuming that the virtual physical model represents objects as electromagnetic charges—the one or more virtual fields are virtual electromagnetic fields and the virtual force represents an electromagnetic force generated due to the virtual charges. For example—assuming that the virtual physical model is a mechanical model—then virtual force fields are driven from the acceleration of the objects. It should be noted that processing circuits can be trained using, at least, any of the training methods illustrated in the applications—for example by applying, mutatis mutandis, any one of methods 200, 300 and 400. The training may be based, for example, on behavioral cloning (BC) and/or on reinforcement learning (RL).

According to an embodiment, step 3020 is followed by step 3030 of generating, based on the one or more fields, visualization information for use in visualizing the one or more virtual fields to the driver.

According to an embodiment, the visualization information represents multiple field lines per virtual field.

According to an embodiment, the multiple field lines per virtual field form multiple ellipses per object of the one or more objects.

The visualization information may be a displayed as a part of a graphical interface that includes graphical elements that represent the virtual fields. The method may include providing a user (such as a driver of the vehicle) with a visual representation of the visual fields.

The visualization information and/or a graphical user interface may be a displayed on a display of a vehicle, on a display of a user device (for example on a mobile phone), and the like.

Figure 11:
FIG. 11 illustrates an example of a scene.

FIG. 11 illustrates an example of an image 3091 of an environment of a vehicle, as seen from a vehicle sensor, with multiple fields lines 3092 per virtual field of an object that is another vehicle.

Figure 12:
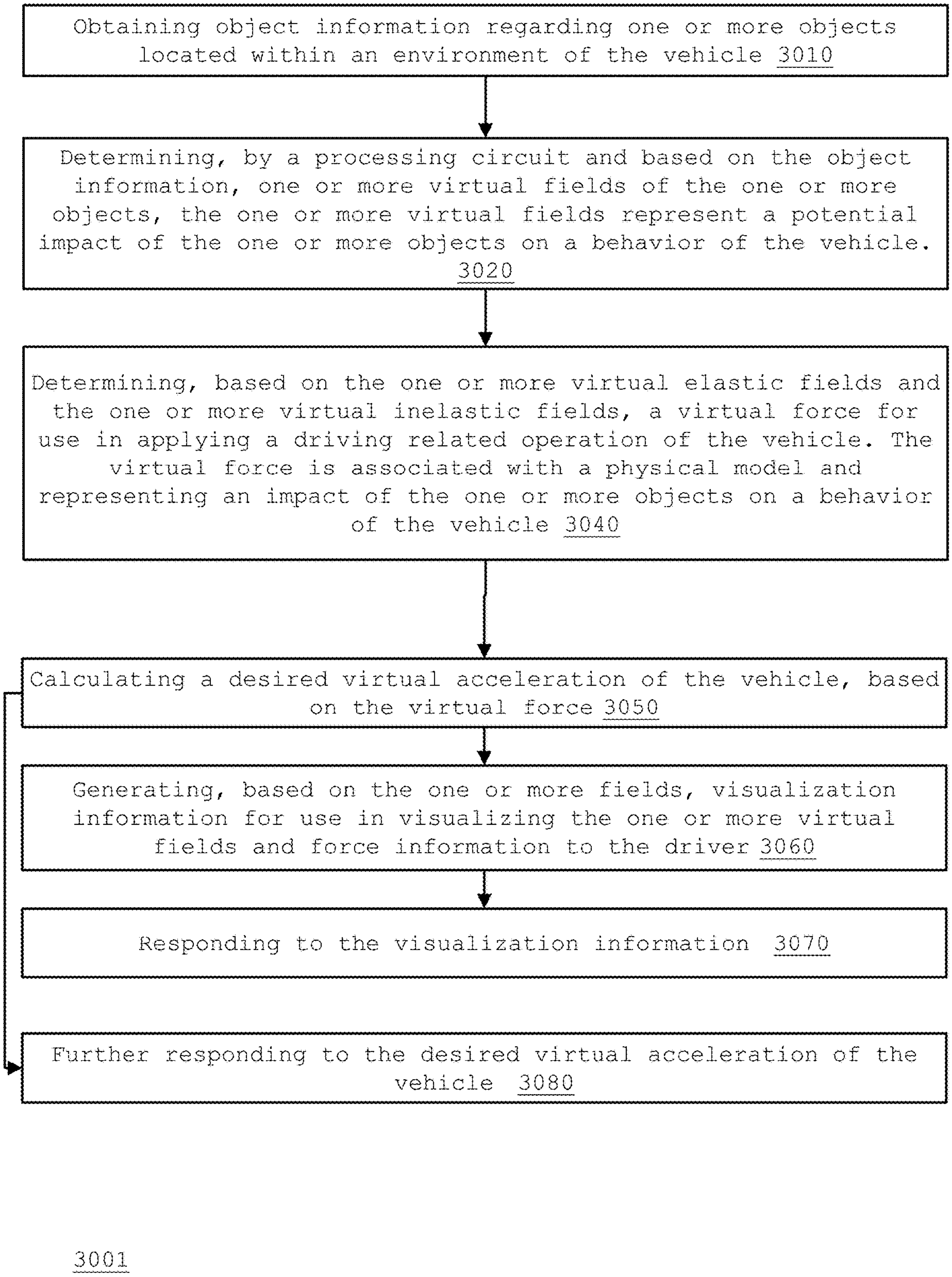
FIG. 12 illustrates an example of a method.

FIG. 12 illustrates an example of a method 3001 for visualization.

According to an embodiment, method 3001 starts by step 3010.

According to an embodiment, step 3010 is followed by step 3020.

According to an embodiment, step 3020 is followed by step 3040 of determining, based on the one or more virtual fields, one or more virtual forces that are virtually applied on the vehicle by the one or more objects.

The one or more virtual forces are associated with a physical model and representing an impact of the one or more objects on a behavior of the vehicle.

According to an embodiment, a virtual force is a force field.

According to an embodiment, a virtual force is a potential field.

According to an embodiment, a virtual force of the one or more virtual forces is represented by virtual curves that are indicative of a strength of the virtual force.

The strength of the virtual force may be represented by one or more of an intensity of the virtual curves, a shape of the virtual curves, or a size (for example width, length, and the like) of the virtual curves.

Step 3040 may include determining a total virtual force virtually applied on the vehicle. The total virtual force may be a sum of the one or more virtual forces.

According to an embodiment, step 3040 is followed by step 3050 of calculating a desired virtual acceleration of the vehicle, based on the virtual force.

Step 3050 may be executed based on assumption regarding a relationship between the virtual force and a desired virtual acceleration of the vehicle. For example—the virtual force may have a virtual acceleration (that is virtually applied on the vehicle) and the desired virtual acceleration of the vehicle may counter the virtual acceleration that is virtually applied on the vehicle.

According to an embodiment—the desired virtual acceleration has a same magnitude as the virtually applied acceleration—but may be directed in an opposite direction.

According to an embodiment—the desired virtual acceleration has an magnitude that differs from the magnitude of the virtually applied acceleration.

According to an embodiment—the desired virtual acceleration has a direction that is not opposite to a direction of the virtually applied acceleration.

According to an embodiment step 3050 is followed by step 3060 of generating, based on the one or more fields, visualization information for use in visualizing the one or more virtual fields and force information.

The force information may represent the one or more virtual forces and/or the desired virtual acceleration.

According to an embodiment, the visualization information represents multiple field lines per virtual field.

According to an embodiment, the multiple field lines per virtual field form multiple ellipses per object of the one or more objects.

According to an embodiment step 3060 is followed by step 3070 of responding to the visualization information.

Step 3060 may include transmitting the visualization information and/or storing the visualization information and/or displaying content represented by the visualization information.

Step 3060 may include displaying the visualization information as a part of a graphical interface that includes graphical elements that represent the virtual fields and/or the desired acceleration, and the like. The graphical user interface provide a user (such as a driver of the vehicle) with a visual representation of the visual fields and/or the desired acceleration.

According to an embodiment, step 3050 is also followed by step 3080 of further responding to the desired virtual acceleration of the vehicle.

According to an embodiment, step 3080 includes at least one of:

a. Triggering a determining of a driving related operation based on the one or more virtual fields.
b. Triggering a performing of a driving related operation based on the one or more virtual fields.
c. Requesting or instructing an execution of a driving related operation.
d. Triggering a calculation of a driving related operation, based on the desired virtual acceleration.
e. Requesting or instructing a calculation of a driving related operation, based on the desired virtual acceleration
f. Sending information about the desired virtual acceleration to a control unit of the vehicle.
g. Taking control over the vehicle—transferring the control from the driver to an autonomous driving unit.

Figure 13:
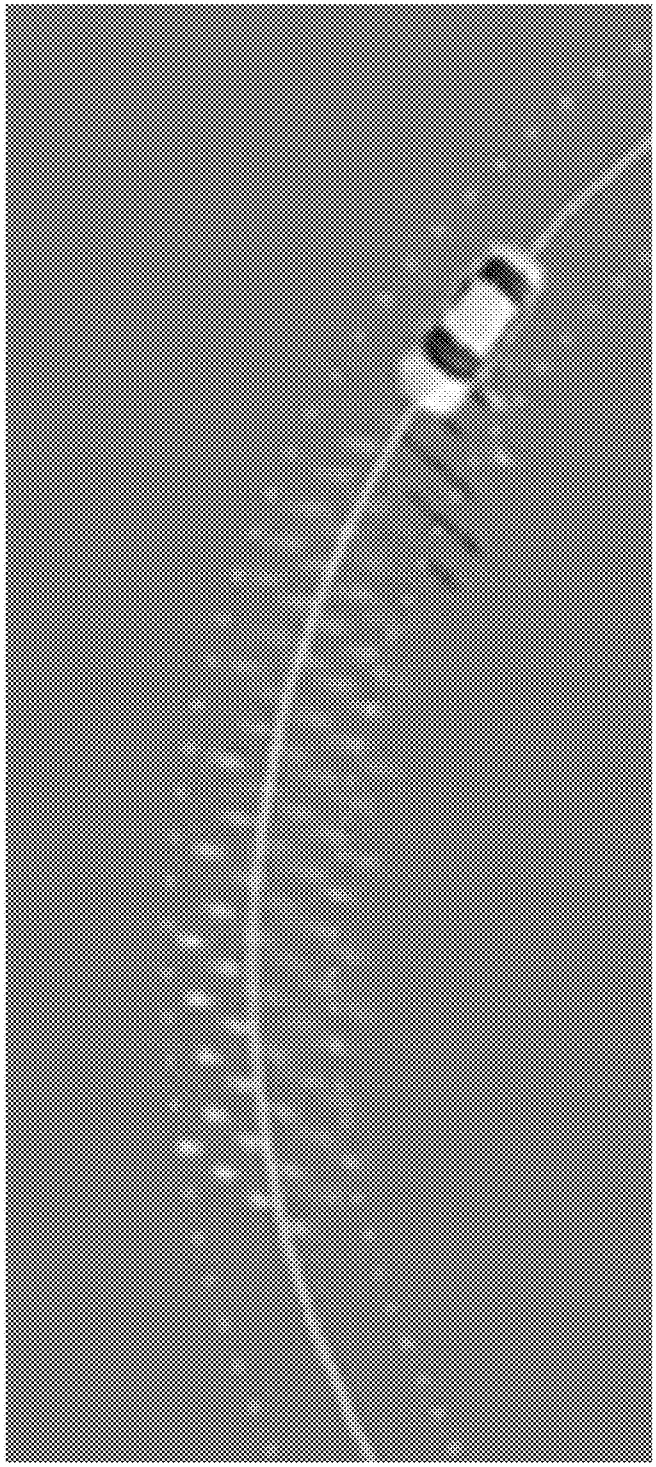
FIGS. 13-16 illustrate examples of images.

FIG. 13 illustrates an example of an environment of a vehicle, as seen from an aerial image, with multiple fields lines per virtual forces applied on the vehicle of an object that is another vehicle. In FIG. 13, any one (or a combination of two or more) of color, direction, and magnitude of the points illustrated in FIG. 13 may indicate the one or more virtual forces being applied at those points.

Figure 14:
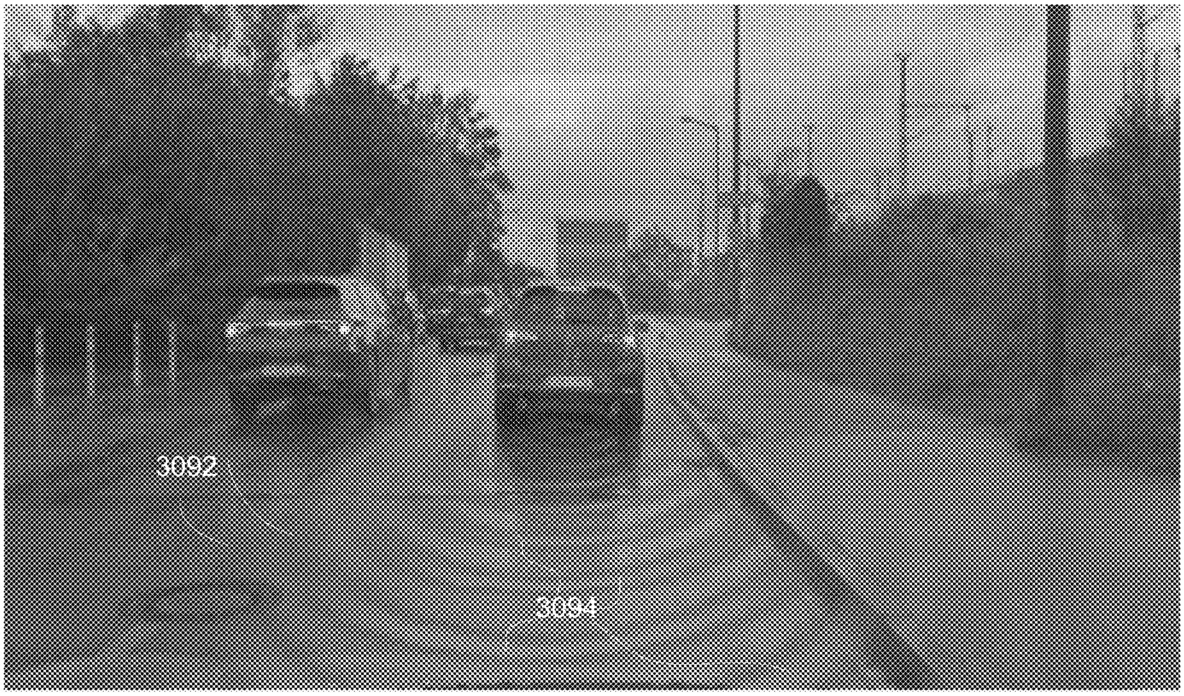

FIG. 14 illustrates an example of an image 3093 of an environment of a vehicle, as seen from a vehicle sensor, with multiple fields lines 3092 per virtual field of an object that is another vehicle, and with indications 3094 of the virtual force applied by the object. In FIG. 14 the indications 3094 are part of ellipses that also include the multiple field lines 3092.

Figure 15:
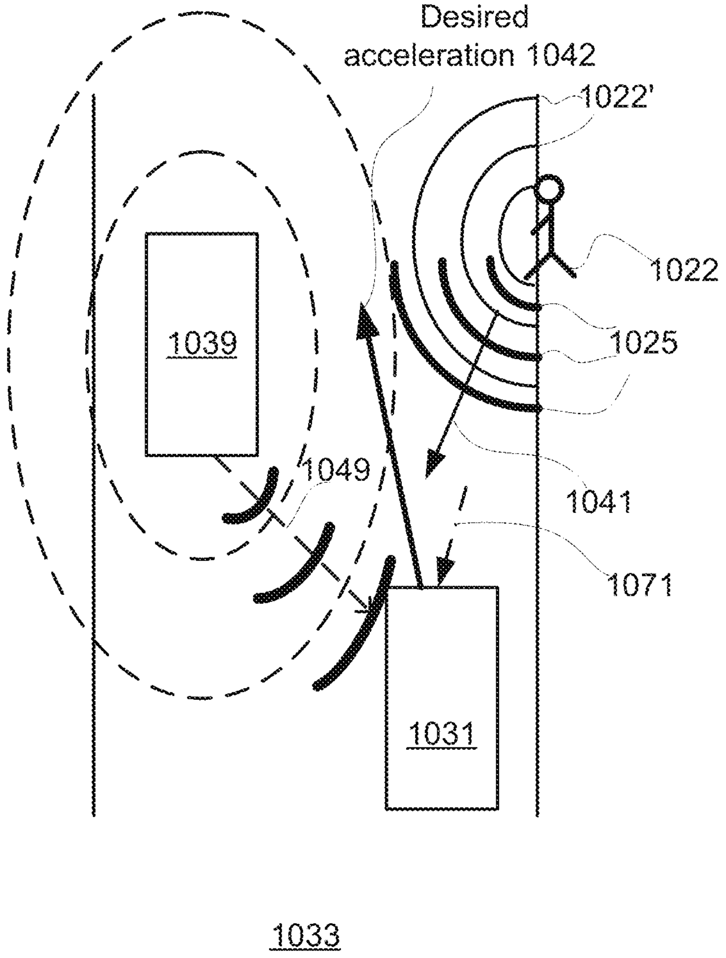

FIG. 15 illustrates an image 1033 of an example of a scene.

FIG. 15 illustrates an example of vehicle 1031 that is located within a segment of a first road.

A pedestrian 1022 starts crossing the segment—in front of the vehicle 1301. The pedestrian is represented by a pedestrian virtual field (illustrated by virtual equipotential field lines 1022' and force indicators 1025), FIG. 15 also illustrates and directional vector 1041 (that may be display or not be displayed) that repels vehicle 1031.

Another vehicle 1039 drives at an opposite lane, has a other vehicle virtual field 1049, other force indicators 1049 and applies a another virtual force 1049 (that may be displayed or not be displayed) on vehicle 1031.

The virtual force applied on vehicle 1031 (as a result of the pedestrian and the other vehicle) is denoted 1071 (and may be displayed or not be displayed). FIG. 15 also illustrates the desired acceleration 1042 of the vehicle. The desired acceleration may be displayed or not be displayed.

Figure 16:

FIG. 16 is an image 3095 that illustrates an environment of a vehicle and another example of visualization—that uses scalar fields. The visualization information was generated by sampling points and determining at what locations within the environment a force from a virtual field would be equal to zero. FIG. 16 includes concentric ellipses 3096 of decreasing intensity up until the locations where the virtual force is zero to show where the virtual field of an object "ends". This type of visualization information illustrates how much force would be exerted on the vehicle were it to be located at any position within the virtual field.

Driving Related Augmented Fields

There is a problem with current ADAS and AV technology (especially vision-based) in that control policies give rise to jerky and non-human driving behavior (e.g. late braking). The perception fields model mitigates that problem and can further be enhanced in order to yield a comfortable driving experience.

Insofar as perception fields are learned through imitation learning, they naturally give rise to ego behavior similar to human driving. To the extent that average human driving is perceived as comfortable by drivers and passengers, so will driving induced by perception fields. There is however a possibility to further the feeling of comfort by modifying the training algorithm of perception fields.

Research into the psychology of and physiological response to driving experiences suggests that minimization of the jerk plays a pivotal role in experienced comfort. The additional requirement of minimizing jerk can easily be incorporated in the perception fields framework by including the jerk in the loss/reward function during training in order to produce comfort-augmented perception fields.

Comfort-augmented perception fields can also accommodate other factors such as acceleration and velocity. In short, any factor that is found to affect the feeling of comfort can be included in the loss or reward function to thus augment the basic perception fields model.

It has been found augmenting virtual fields based on comfort or other factors may further improve the driving.

Figure 17:
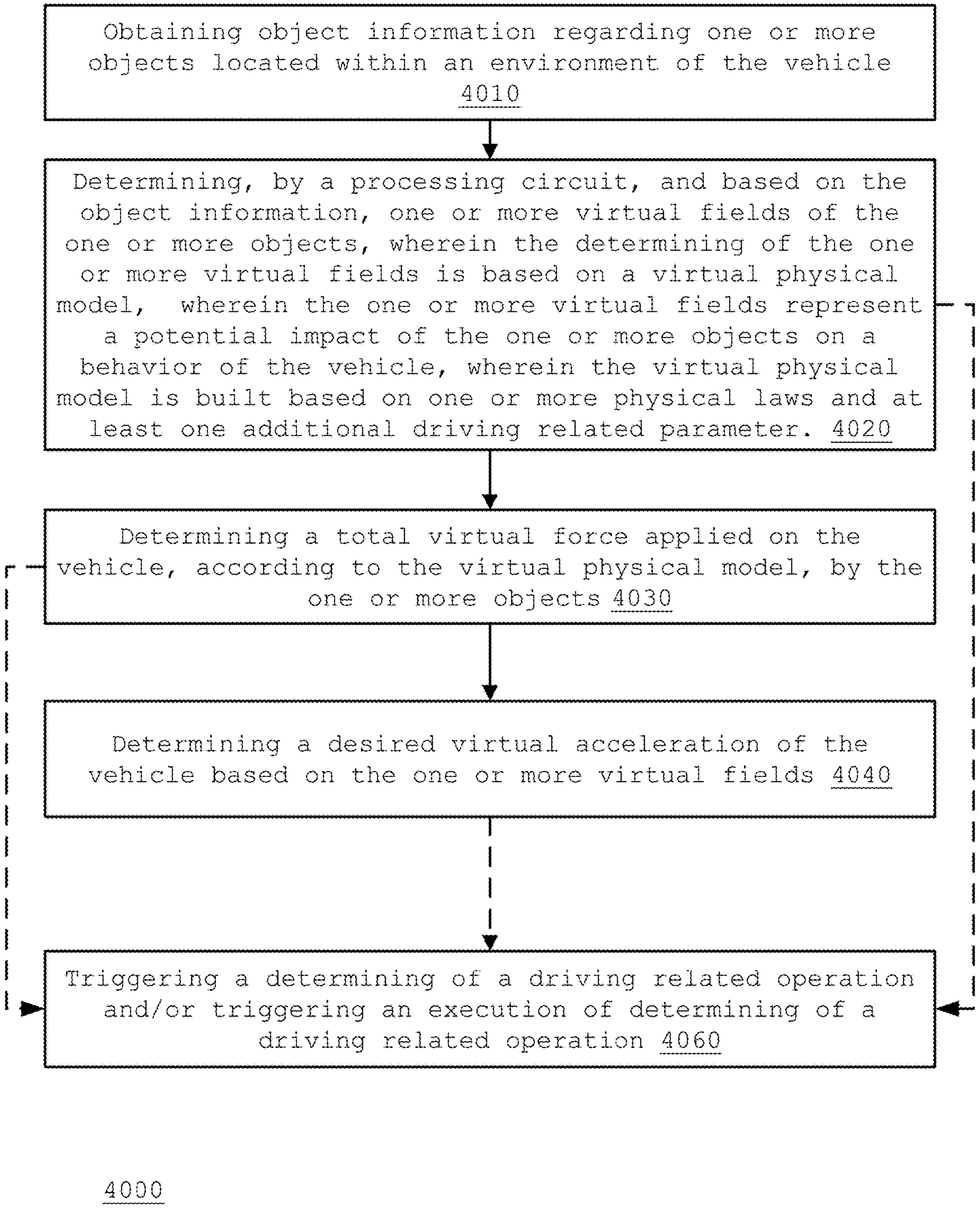
FIGS. 17, 18, 19, 20 and 21 illustrate examples of methods.

FIG. 17 illustrates an example of method 4000 for augmented driving related virtual fields.

According to an embodiment, method 4000 starts by step 4010 of obtaining object information regarding one or more objects located within an environment of the vehicle.

According to an embodiment, step 4010 also includes analyzing the object information. The analysis may include determining location information and/or movement information of the one or more objects. The location information and the movement information may include the relative location of the one or more objects (in relation to the vehicle) and/or the relative movement of the one or more objects (in relation to the vehicle).

According to an embodiment, step 4010 is followed by step 4020 of determining, by a processing circuit, and based on the object information, one or more virtual fields of the one or more objects, wherein the determining of the one or more virtual fields is based on a virtual physical model, wherein the one or more virtual fields represent a potential impact of the one or more objects on a behavior of the vehicle, wherein the virtual physical model is built based on one or more physical laws and at least one additional driving related parameter.

According to an embodiment, the processing circuit was trained based on reference driving patterns. The at least one additional driving related parameter includes a driver parameter related to one or more differences between one or more types of driving patterns of the driver and one or more types of the reference driving patterns.

According to an embodiment, the at least one additional driving related parameter includes a driver driving pattern related parameter that is related to one or more driving patterns of the driver.

According to an embodiment, the at least one additional driving related parameter includes a fuel consumption parameter.

According to an embodiment, the at least one additional driving related parameter includes a safety parameter.

According to an embodiment, the at least one additional driving related parameter comprises a comfort parameter.

The comfort parameter may relate to a comfort of a driver of the vehicle during driving.

The comfort parameter may relate to a comfort of one or more road users located outside the vehicle—for example the comfort or other drivers and/or pedestrians located in proximity to the vehicle (for example within 0.1-20 meters from the vehicle).

The comfort parameter may relate to a comfort of one or more passenger other than the driver during driving.

The comfort parameter may relate to a comfort of the driver and one or more other passengers within the vehicle during driving.

The driver's comfort may be prioritized over those of one or more passengers—for safety reasons.

The driver, a passenger or any other authorized entity may define the manner in which a comfort of any person should be taken into account.

The comfort level may be set by the driver, a passenger or any other authorized entity.

For example—assuming that the virtual physical model represents objects as electromagnetic charges—the one or more virtual fields are virtual electromagnetic fields and the virtual force represents an electromagnetic force generated due to the virtual charges.

For example—assuming that the virtual physical model is a mechanical model—then virtual force fields are driven from the acceleration of the objects. It should be noted that processing circuits can be trained using, at least, any of the training methods illustrated in the applications—for example by applying, mutatis mutandis, any one of methods 200, 300 and 400. The training may be based, for example, on behavioral cloning (BC) and/or on reinforcement learning (RL). The training may also take into account the one or more additional driving related parameters. For example—a loss function may be fed by a desired value of an additional driving related parameter and an estimated current driving related parameter—and aim to reduce the gap between the desired and estimated current additional driving related parameter.

Assuming that the additional driving related parameter is comfort—the comfort can be evaluated based on explicit feedback from a driver, from monitoring a physiological parameter (such as heart rate, perspiration, blood pressure, change in skin color), detecting shouts or other audio and/or visual information indicative of stress.

According to an embodiment, step 4020 is followed by step 4030 of determining a total virtual force applied on the vehicle, according to the virtual physical model, by the one or more objects.

According to an embodiment, step 4030 is followed by step 4040 of determining a desired virtual acceleration of the vehicle based on the one or more virtual fields.

Step 4040 may be executed based on assumption regarding a relationship between the virtual force and a desired virtual acceleration of the vehicle. For example—the virtual force may have a virtual acceleration (that is virtually applied on the vehicle) and the desired virtual acceleration of the vehicle may counter the virtual acceleration that is virtually applied on the vehicle.

According to an embodiment—the desired virtual acceleration has a same magnitude as the virtually applied acceleration—but may be directed in an opposite direction.

According to an embodiment—the desired virtual acceleration has an magnitude that differs from the magnitude of the virtually applied acceleration.

According to an embodiment—the desired virtual acceleration has a direction that is not opposite to a direction of the virtually applied acceleration.

According to an embodiment, step 4040 is executed regardless of a current comfort parameter of a driver of the vehicle or of a current comfort parameter of any other passenger of the vehicle.

According to an embodiment, method 4000 includes obtaining a current comfort parameter of a driver of the vehicle, and step 4040 is executed also based on a current comfort parameter of the driver and/or based on current comfort parameter of any other passenger of the vehicle.

According to an embodiment, method 4000 includes step 4060 of triggering a determining of a driving related operation and/or triggering an execution of determining of a driving related operation.

According to an embodiment step 4060 is preceded by step 4020 and any of the triggering is based on the one or more virtual fields.

According to an embodiment step 4060 is preceded by step 4030 and any of the triggering is based on the total virtual force applied on the vehicle.

According to an embodiment step 4060 is preceded by step 4040 and any of the triggering is based on the desired virtual acceleration of the vehicle.

Figure 18:
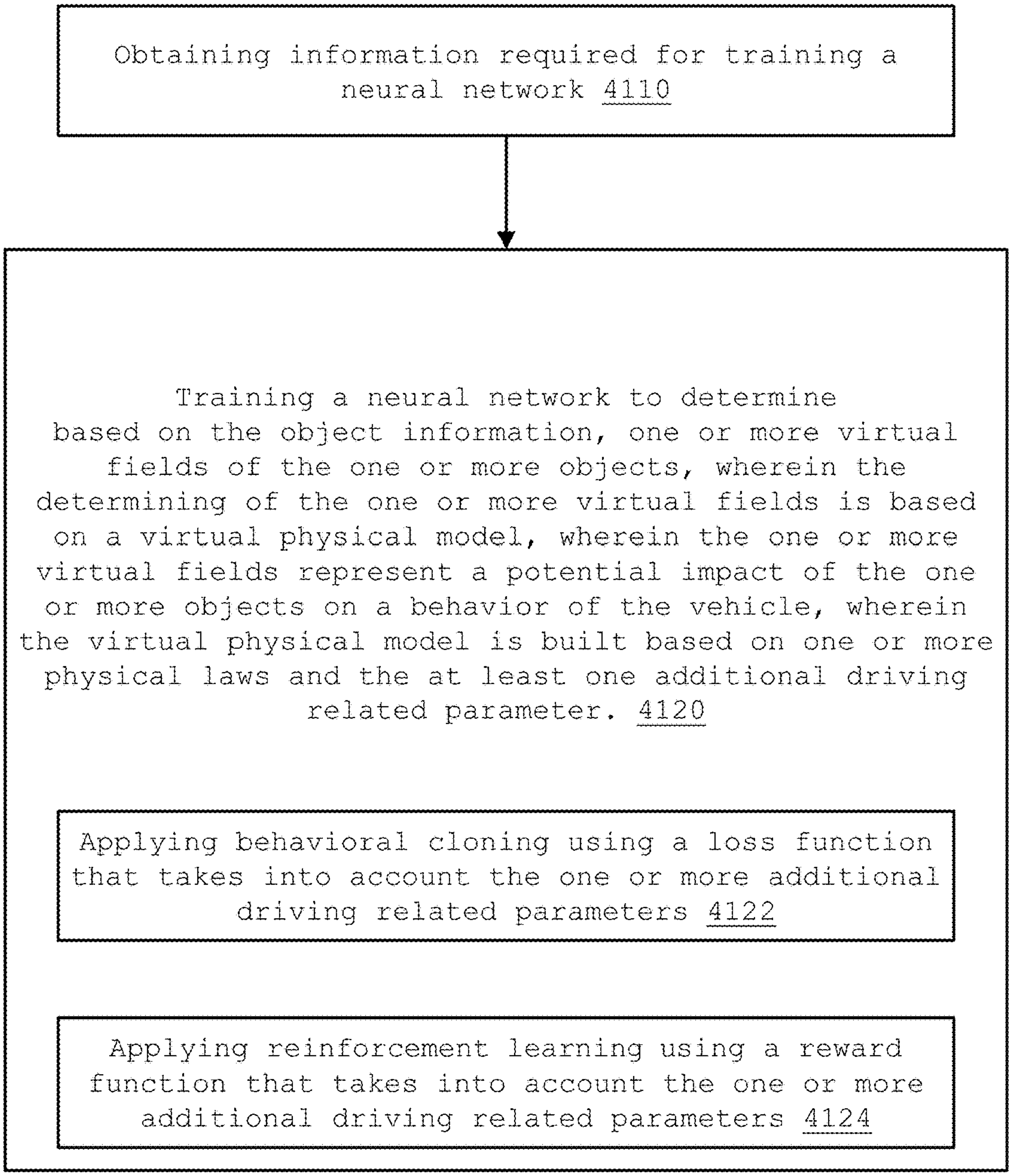

FIG. 18 illustrates an example of method 4100 for training.

According to an embodiment method 4100 includes step 4110 of obtaining information required for training a neural network. The information may include desired driver patterns and/or desired values of additional driving related parameters and/or a virtual physical model.

According to an embodiment, step 4110 is followed by step 4120 of training a neural network to determine, based on the object information, one or more virtual fields of the one or more objects, wherein the determining of the one or more virtual fields is based on a virtual physical model, wherein the one or more virtual fields represent a potential impact of the one or more objects on a behavior of the vehicle, wherein the virtual physical model is built based on one or more physical laws and the at least one additional driving related parameter According to an embodiment, step 4120 may be followed by training the neural network (or another computational entity) to determine a total virtual force applied on a vehicle, according to the virtual physical model, by the one or more objects.

According to an embodiment, step 4120 may be followed by training the neural network (or another computational entity) to determine a desired virtual acceleration of the vehicle based on the one or more virtual fields.

Personalization of Virtual Fields

The basic form of perception fields (PFs) is learned using human and simulation data. However, there is a possibility for end-users of vehicles endowed with PF technology to "fine-tune" training in order for the behavior induced by the perception fields to more closely match that of the end-user in question.

Figure 19:
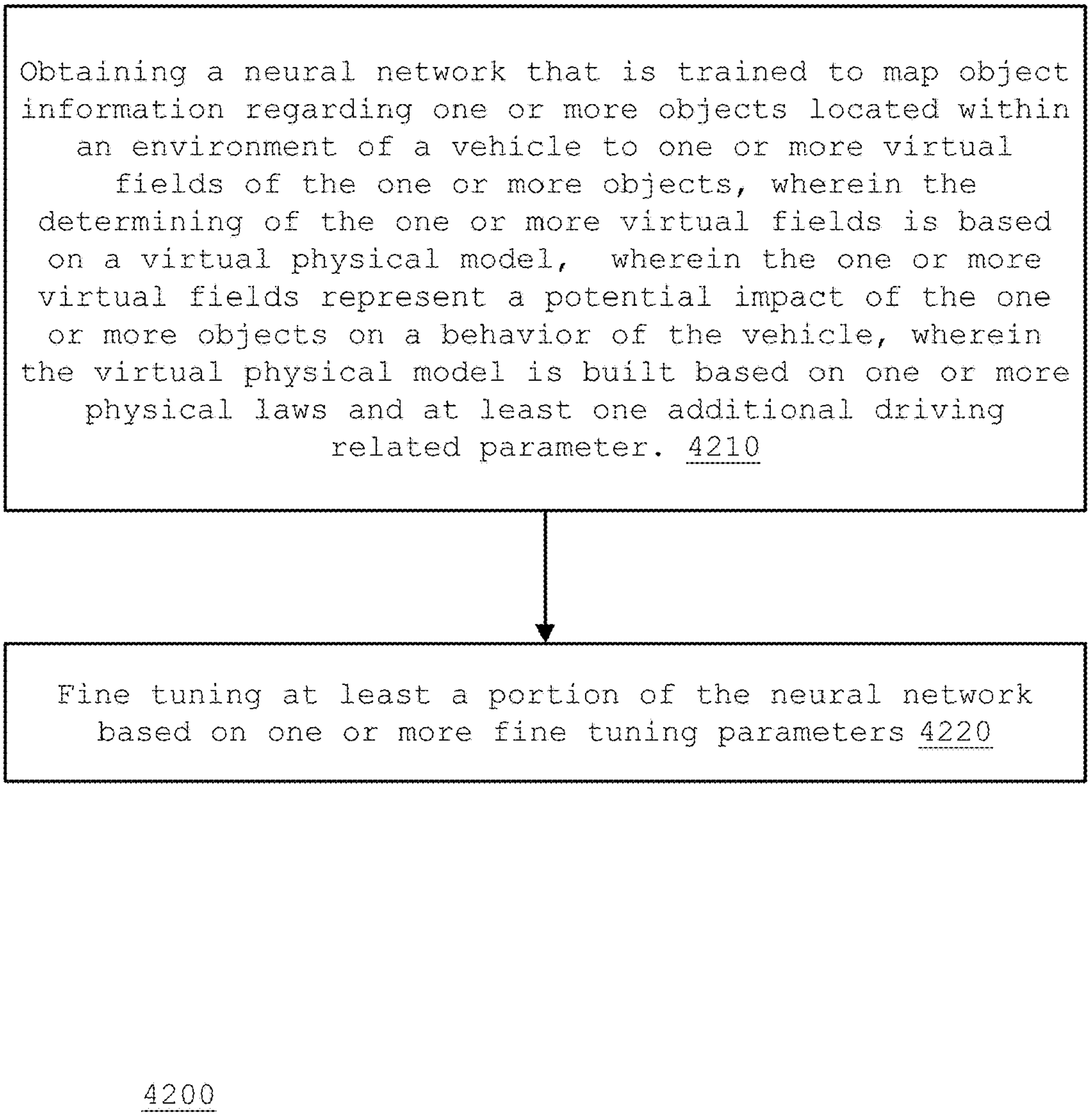

According to an embodiment—this can be done by:

a. Allowing the PF software in the vehicle to "unfreeze" the weights and biases of the last layer(s) of the neural networks comprising the PFs
b. Repeating, for each driving maneuver of a group of driving maneuvers:
   i. Have the end-user perform one of a set of preselected driving maneuvers which is recorded by the software together with relevant data on the environment.
   ii. Using the difference between this driving maneuver and the one prescribed by the default PFs is taken to be the loss function whereby backpropagation updates the weights and biases of the last layer(s) of the neural networks comprising the PFs, FIG. 19 illustrates an example of method 4200 for updating a neural network.

According to an embodiment, method 4200 starts by step 4210 of obtaining a neural network that is trained to map object information regarding one or more objects located within an environment of a vehicle to one or more virtual fields of the one or more objects, wherein the determining of the one or more virtual fields is based on a virtual physical model, wherein the one or more virtual fields represent a potential impact of the one or more objects on a behavior of the vehicle, wherein the virtual physical model is built based on one or more physical laws and at least one additional driving related parameter.

Examples of such a neural network and/or examples of training such a neural network are provided in the previous text and/or in the previous FIGURES.

According to an embodiment the neural network is implemented by a processing circuit—for example—the processing circuit that executes method 4000.

The obtaining may include receiving the neural network (for example without training the neural network) or generating the neural network (for example—the generating may include training).

According to an embodiment—step 4210 is followed by step 4220 of fine tuning at least a portion of the neural object based on one or more fine tuning parameters.

According to an embodiment, the fine tuning is executed by the same loss function used during the training. Alternatively, the fine tuning is executed by a new loss function used during the training. In any case the loss function may be determined in any manner—may be predefined and/or given to the fine tuning phase.

According to an embodiment, step 4220 does not involve training or retraining the entire neural network.

Step 4220 includes limiting the resources allocated to the fine tuning—especially in relation to the resources required to fully train the neural network.

The limitation of the resource may include at least one of:

a. A fine tuning of a portion—and not all the neural networks. The portion may be a single layer, more than one layer, up to 1, 5, 10, 1 5, 25, 30, 35, 40, 45, 50, 55 percent of the entire neural network.
b. Limiting the size of the dataset. For example limiting the fine tuning to images acquired by the vehicle during a limited period of time—for example less than 1, 5, 10, 15, 30 minutes, less than 1, 2, 3, 5 hours, less than 1, 2, days, and the like. Another example of size limitation is limiting the dataset to less than 100, 200, 500, 1000, 2000, 5000 images and/or less than 0.001%, 0.01%, 0.1%, 1%, 5% of the size of the dataset used for training the neural network.
c. Limiting the learning rate.
d. Limiting the neural network parameter affected by the fine tuning.

Various computer science benefits are obtained when the fine tuning is applied while limiting resources. Much less computational resources and/or much less memory resources may be required in comparison to a full training or retraining of the entire neural network.

The fine tuning mentioned above can be executed by a more compact neural network and loss function—while adapting the neural network according to the one or more fine tuning parameters.

According to an embodiment the fine tuning may be executed by the vehicle—and may not require highly complex neural network and/or infrastructure and/or large datasets.

The reduction of resources can be by a factor of at least 5, 10, 20, 50, 100, 200, 500, 1000 and even more.

According to an embodiment—the one or more fine tuning parameters include fuel consumption and/or wear of the vehicle and/or comfort of a passenger of the vehicle and/or safety parameter and/or any other driving related parameter.

According to an embodiment, the one or more fine tuning parameters are driving patterns made by the vehicle under a control of a driver of the vehicle. The driving patterns may be predefined or not.

According to an embodiment—the at least portion may include (or may be limited to) one layer or two or more layers or all layers of the neural network may be amended during the retraining.

For example—step 4220 includes updating one or more neural network parameters such as at least one of the weights and biases of a last layer of the neural network while keeping weights and biases of other layers of the neural network unchanged.

Yet for another example—only the weights and biases of a last layer of the last layers are amended during step 4220—while other layers remain unchanged.

Any other layer of the neural network may be amended during the retraining.

The neural network was trained to mimic reference driving patterns. This could be done using RL and/or BC.

According to an embodiment, step 4220 include calculating differences between the driving patterns made by the driver and the reference driving pattern, and using the differences to amend the neural network. For example—the differences may be fed to a loss function.

Figure 20:
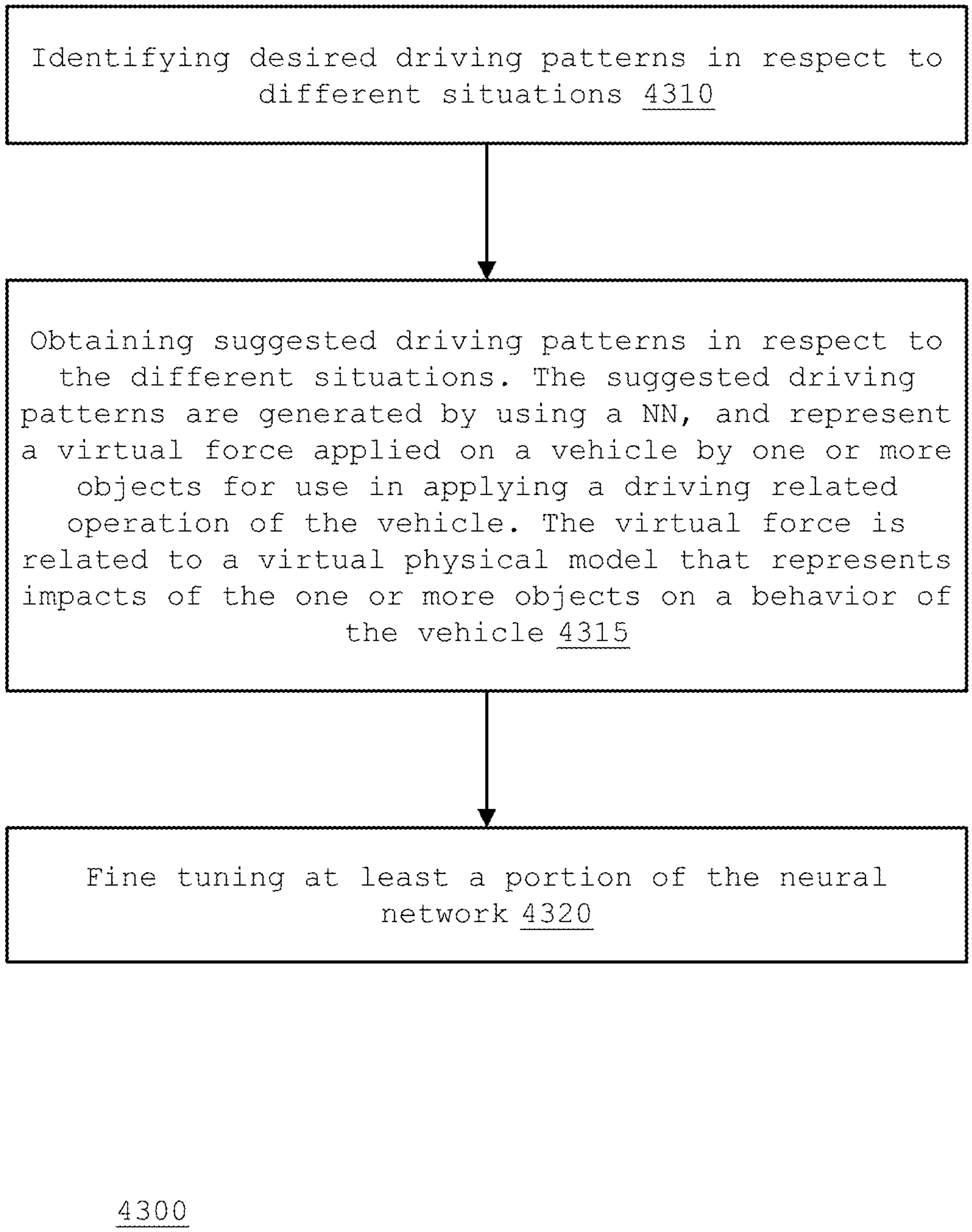

FIG. 20 illustrates an example of method 4300 of fine tuning a neural network.

According to an embodiment, method 4300 includes step 4310 of identifying desired driving patterns in respect to different situations. The identification may be a part of a behavioral cloning or be a part of a reinforcement learning.

A situation may be at least one of (a) a location of the vehicle, (b) one or more weather conditions, (c) one or more contextual parameters, (d) a road condition, (e) a traffic parameter. The road condition may include the roughness of the road, the maintenance level of the road, presence of potholes or other related road obstacles, whether the road is slippery, covered with snow or other particles. The traffic parameter and the one or more contextual parameters may include time (hour, day, period or year, certain hours at certain days, and the like), a traffic load, a distribution of vehicles on the road, the behavior of one or more vehicles (aggressive, calm, predictable, unpredictable, and the like), the presence of pedestrians near the road, the presence of pedestrians near the vehicle, the presence of pedestrians away from the vehicle, the behavior of the pedestrians (aggressive, calm, predictable, unpredictable, and the like), risk associated with driving within a vicinity of the vehicle, complexity associated with driving within of the vehicle, the presence (near the vehicle) of at least one out of a kindergarten, a school, a gathering of people, and the like. Examples of situations are provided in U.S. patent application Ser. No. 16/729,589 titled SITUATION BASED PROCESSING which is incorporated herein by reference.

The suggested driving patterns are generated by using a neural network (NN) and represent a virtual force applied on a vehicle by one or more objects for use in applying a driving related operation of the vehicle, the virtual force is related to a virtual physical model that represents impacts of the one or more objects on a behavior of the vehicle. The suggested driving patterns are generated by the NN when the NN is fed by sensed information units that capture the different situations.

According to an embodiment, step 4310 is followed by step 4315 of obtaining suggested driving patterns in respect to the different situations. The suggested driving patterns are generated by using a NN, and represent a virtual force applied on a vehicle by one or more objects for use in applying a driving related operation of the vehicle. The virtual force is related to a virtual physical model that represents impacts of the one or more objects on a behavior of the vehicle. Examples of the virtual physical model and/or of the virtual force are illustrated in previous parts of the specification and/or in FIGURES that precede FIG. 20.

According to an embodiment, step 4315 is followed by step 4320 of fine tuning at least a portion of the neural network.

According to an embodiment—the fine tuning is performed based on one or more fine tuning parameters. At least some examples of the one or more fining tuning parameters are listed above.

According to an embodiment—the fine tuning may be executed by the same entity as the training of the neural network—for example by a manufacturing entity and/or a programming entity and/or a neural network training and fine tuning entity.

According to an embodiment—the fine tuning is executed following a software update.

According to an embodiment—the fine tuning is executed before the vehicle is supplied to a user.

According to an embodiment—the fine tuning is initiated by a user of the vehicle.

According to an embodiment—the fine tuning is based on sensed data units obtained during one or more driving session of the vehicle.

According to an embodiment, the fine tuning is based on a driving parameter and a relationship between the desired driving patterns and the suggested driving patterns.

According to an embodiment, the fine tuning is based on a relationship between the desired driving patterns and the suggested driving patterns.

According to an embodiment the fine tuning includes reducing (for example using a loss function) the differences between the desired driving patterns and the suggested driving patterns. The reduction may be also responsive to another fine tuning parameter.

According to an embodiment—step 4320 includes limiting the resources allocated to the fine tuning—especially in relation to the resources required to fully train the neural network.

The limitation of the resource may include at least one of:

a. A fine tuning of a portion—and not all the neural networks. The portion may be a single layer, more than one layer, up to 1, 5, 10, 1 5, 25, 30, 35, 40, 45, 50, 55 percent of the entire neural network.
b. Limiting the size of the dataset. For example limiting the fine tuning to images acquired by the vehicle during a limited period of time—for example less than 1, 5, 10, 15, 30 minutes, less than 1, 2, 3, 5 hours, less than 1, 2, days, and the like. Another example of size limitation is limiting the dataset to less than 100, 200, 500, 1000, 2000, 5000 images and/or less than 0.001%, 0.01%, 0.1%, 1%, 5% of the size of the dataset used for training the neural network.
c. Limiting the learning rate.
d. Limiting a number of neural network parameters affected by the fine tuning.

Various computer science benefits are obtained when the fine tuning is applied while limiting resources. Much less computational resources and/or much less memory resources may be required in comparison to a full training or retraining of the entire neural network.

The fine tuning mentioned above can be executed by a more compact neural network and loss function—while adapting the neural network according to the one or more fine tuning parameters.

According to an embodiment the fine tuning may be executed by the vehicle—and may not require highly complex neural network and/or infrastructure and/or large datasets.

The reduction of resources can be by a factor of at least 5, 10, 20, 50, 100, 200, 500, 1000 and even more.

Figure 21:
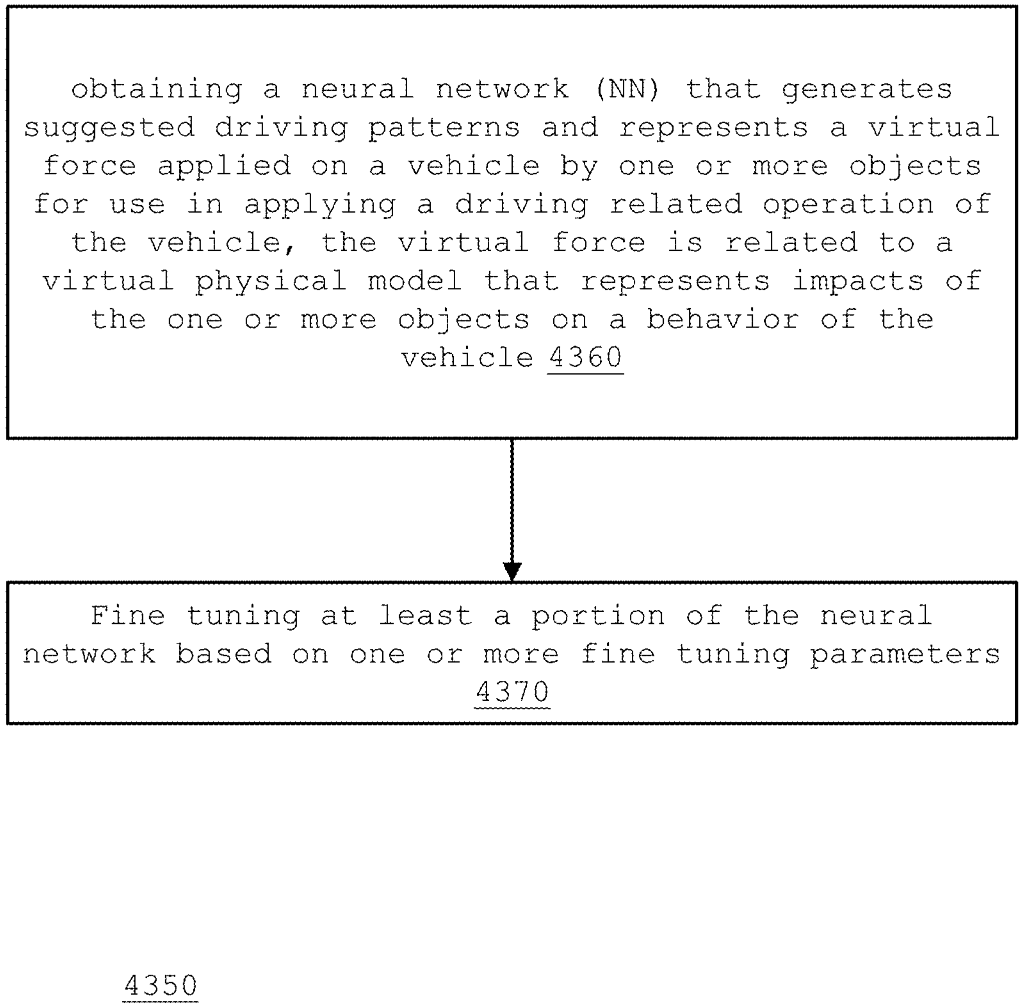

FIG. 21 illustrates an example of method 4350.

According to an embodiment, method 4350 starts by step 4360 of obtaining a neural network (NN) that generates suggested driving patterns and represents a virtual force applied on a vehicle by one or more objects for use in applying a driving related operation of the vehicle, the virtual force is related to a virtual physical model that represents impacts of the one or more objects on a behavior of the vehicle.

According to an embodiment, step 4350 is followed by step 4370 of fine tuning at least a portion of the neural network based on one or more fine tuning parameters.

According to an embodiment, step 4370 includes tuning only a selected portion of the NN.

According to an embodiment, step 4370 includes fine tuning only a selected layer of the NN.

According to an embodiment, step 4370 includes fine tuning only a last layer of the NN.

According to an embodiment, step 4370 is triggered by a driver of the vehicle—for example an using a mobile device in communication with the vehicle, by interacting with a man machine interface (voice command and/or touch screen and/or knob or button interface).

According to an embodiment, step 4370 is triggered by a driving action associated with a driver of the vehicle. For example—performing a certain driving maneuver.

According to an embodiment, step 4370 includes triggering the fine tuning by a software update. The software update may enable the driver to select whether to perform the fine tuning. Alternatively—the fine tuning may be triggered automatically with the software update.

According to an embodiment, step 4370 includes limiting a size of a data set used during the fine tuning to be less than one percent than a dataset used to train the NN.

The method may include (see for example FIG. 20) obtaining desired driving patterns, and wherein step 4370 includes reducing differences between the desired driving patterns and the suggested driving patterns. Thus the fine tuning may provide driving patterns that better mimic the desired driving patterns.

Training and Testing a Machine Learning Process

According to an embodiment, a machine learning process is trained to generate virtual forces.

The benefits of using virtual forces include, for example—explainability, generalizability and a robustness to noisy input. These benefits are explained in previous parts of the application. An additional benefit to the virtual field approach is that it is not dependent on any specific hardware, and not computationally more expensive than existing methods.

It has been found that when training the network based solely on acquired SIUs, the acquired SIUs represent a certain number of scenarios. Accordingly—the trained machine learning process may not respond in a desired manner to other scenarios. The suggested method solves this problem by testing the trained machine learning process at other scenarios. The other scenarios may be simulated or generated or received in any other manner.

Testing the machine learning process—especially before the machine learning process is implemented by vehicles that were sole to customers—is highly beneficial.

According to an embodiment, if the machine learning process failed the test—for example is response to an unknown scenario in a manner that violates a safety policy and/or damages the vehicle and/or hurts any human within the vehicle and/or causes an accident or a near accident—the machine learning process is retrained with at least some of the other scenarios used during the testing.

Thus—the testing improves the safety related to the usage of the machine learning process.

Furthermore—the usage of simulation is much more effective (memory resources and computational resources) than basing the training only on real images acquired of real driving maneuvers.

Figure 22:
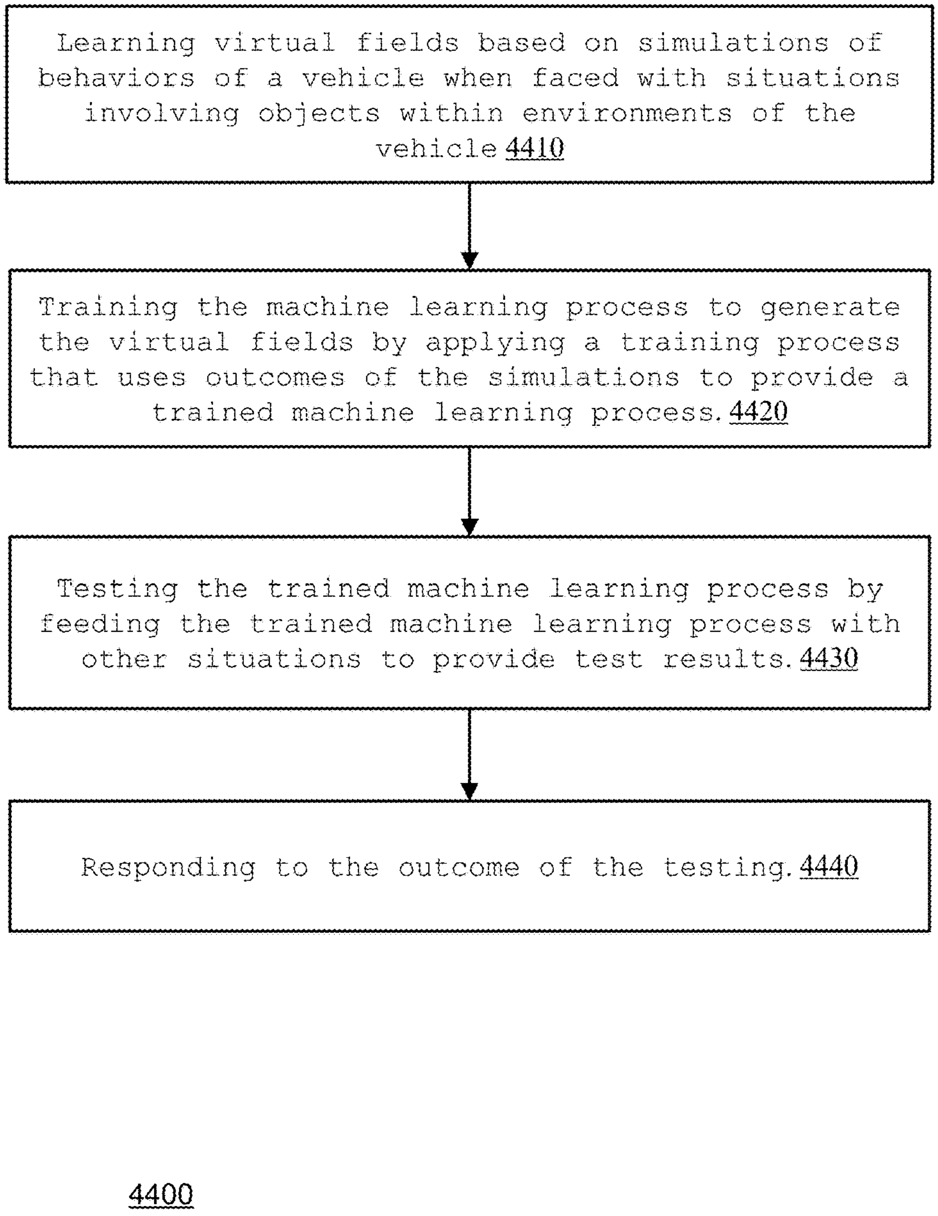
FIG. 22 illustrates an example of a method.

FIG. 22 illustrates an example of method 4400 for training and testing a machine learning process, the method.

According to an embodiment, method 4400 includes step 4410 of learning virtual fields based on simulations of behaviors of a vehicle when faced with situations involving objects within environments of the vehicle, the virtual fields represent potential impacts of objects on the behaviors of the vehicle, wherein the learning is based on a virtual physical mode.

According to an embodiment, the virtual physical model represents objects as electromagnetic charges and the virtual fields are virtual electromagnetic fields.

According to an embodiment, the virtual physical model is a mechanical model and the virtual fields are driven from acceleration of the objects.

According to an embodiment the situations involve a closest in path vehicle (CIPV) that precedes the vehicle.

According to an embodiment, the machine learning process is an automatic cruise control (ACC) machine learning process.

According to an embodiment, step 4410 is followed by step 4420 of training the machine learning process to generate the virtual fields by applying a training process that uses outcomes of the simulations to provide a trained machine learning process.

According to an embodiment, step 4420 is followed by step 4430 of testing the trained machine learning process by feeding the trained machine learning process with other situations to provide test results.

According to an embodiment, step 4430 is followed by step 4440 of responding to the outcome of the testing.

According to an embodiment, when the machine learning process succeeded in the testing—the machine learning process may be programmed to and/or provided to the vehicle.

According to an embodiment, when the machine learning process fails the testing—the machine learning process may be declared unsafe and/or may be retrained.

According to an embodiment, the retraining includes utilizing one or more of the other situations during the retraining. Thus—one or more of the other situations are fed to the machine learning process during the retraining.

Any other process for improving and/or adapting the machine learning process to operate in a desired manner when facing any of the other scenarios may be applied. Retraining is an example of such a process.

Figure 23:
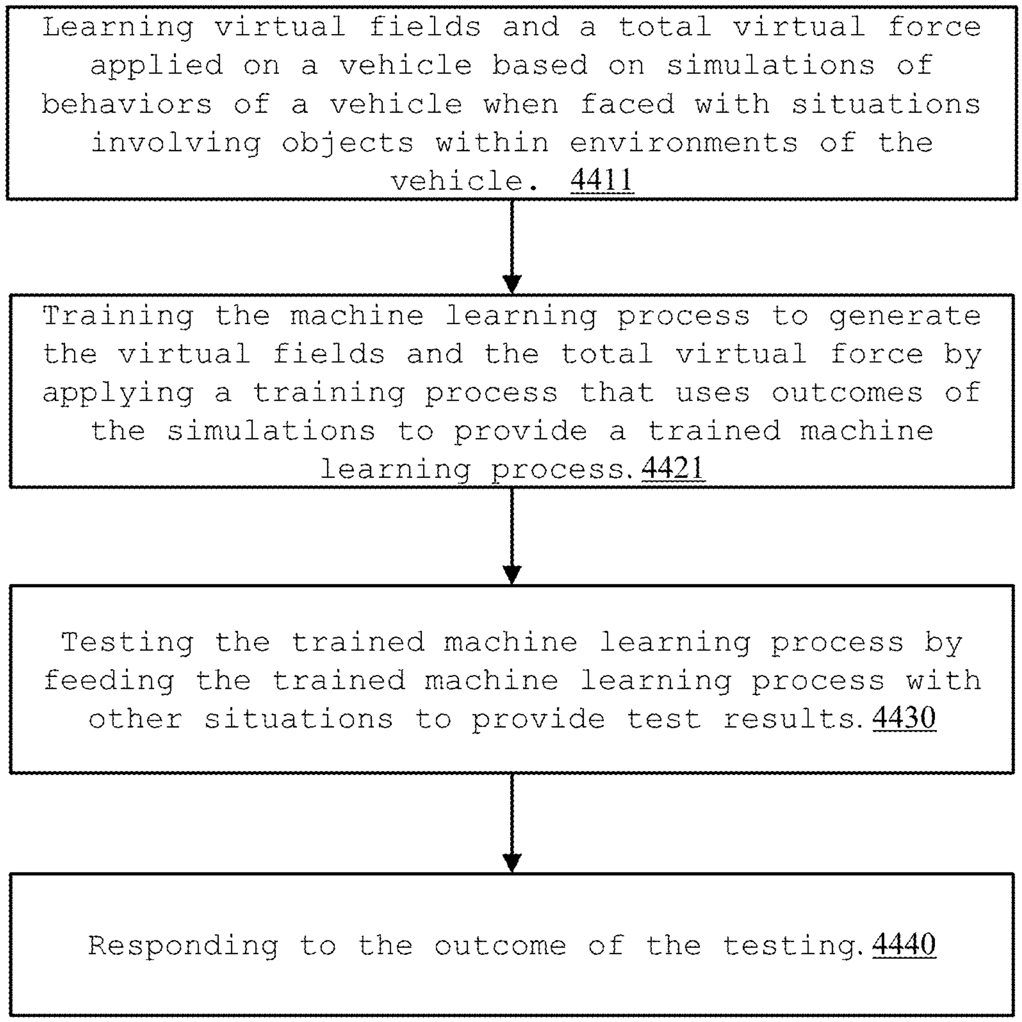
FIG. 23 illustrates an example of a method.

FIG. 23 illustrates an example of method 4401 for training and testing a machine learning process.

According to an embodiment, method 4401 includes step 4411 of learning virtual fields and a total virtual force applied on a vehicle based on simulations of behaviors of a vehicle when faced with situations involving objects within environments of the vehicle.

The virtual fields represent potential impacts of objects on the behaviors of the vehicle, wherein the learning is based on a virtual physical mode.

According to an embodiment, the total virtual force applied on a vehicle is a function of the virtual fields.

According to an embodiment step 4411 is followed by step 4421 of training the machine learning process to generate the virtual fields and the total virtual force by applying a training process that uses outcomes of the simulations to provide a trained machine learning process.

According to an embodiment, the machine learning process outputs the total virtual force and not the virtual fields.

According to an embodiment, the machine learning process outputs the total virtual force and the virtual fields.

According to an embodiment, step 4421 is followed by step 4430 of testing the trained machine learning process by feeding the trained machine learning process with other situations to provide test results.

According to an embodiment, step 4430 is followed by step 4440 of responding to the outcome of the testing.

Figure 24:
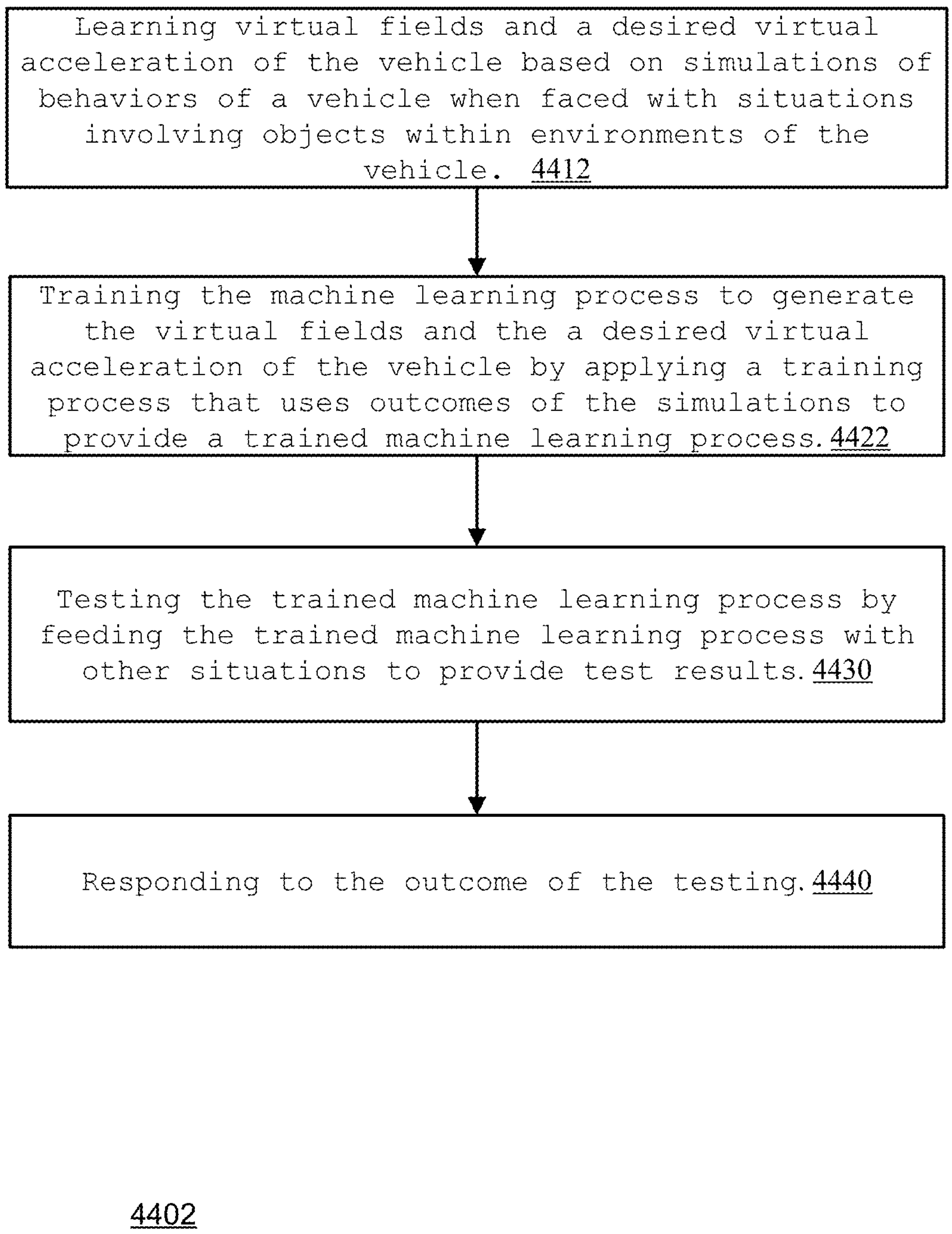
FIG. 24 illustrates an example of a method.

FIG. 24 illustrates an example of method 4402 for training and testing a machine learning process.

According to an embodiment, method 4402 includes step 4412 of learning virtual fields and a desired virtual acceleration of the vehicle.

According to an embodiment the desired virtual acceleration of the vehicle is indicative of a desired behavior of the vehicle. Determining the desired virtual acceleration at different points of time define a desired path of the vehicle.

According to an embodiment, the desired virtual acceleration of the vehicle is based on a total virtual force applied on a vehicle. The total virtual force applied on a vehicle is a function of the virtual fields.

According to an embodiment, the desired virtual acceleration of the vehicle counters the total virtual force—for example has the same absolute value but has an opposite direction.

According to an embodiment, the desired virtual acceleration of the vehicle differs from the total virtual force—and not just by direction. This may result from applying one or more rules such as comfort of driver rules, insurance policy rules, and the like.

According to an embodiment, the total virtual force applied on a vehicle is a function of the virtual fields.

According to an embodiment step 4412 is followed by step 4422 of training the machine learning process to generate the virtual fields and the desired virtual acceleration by applying a training process that uses outcomes of the simulations to provide a trained machine learning process.

According to an embodiment, the machine learning process outputs the total virtual force and not the virtual fields.

According to an embodiment, the machine learning process outputs the total virtual force and the virtual fields.

According to an embodiment, step 4422 is followed by step 4430 of testing the trained machine learning process by feeding the trained machine learning process with other situations to provide test results.

According to an embodiment, step 4430 is followed by step 4440 of responding to the outcome of the testing.

According to an embodiment, any of the tested machine learning processes mentioned above is used during inference—for example by a vehicle processing circuit.

Figure 25:
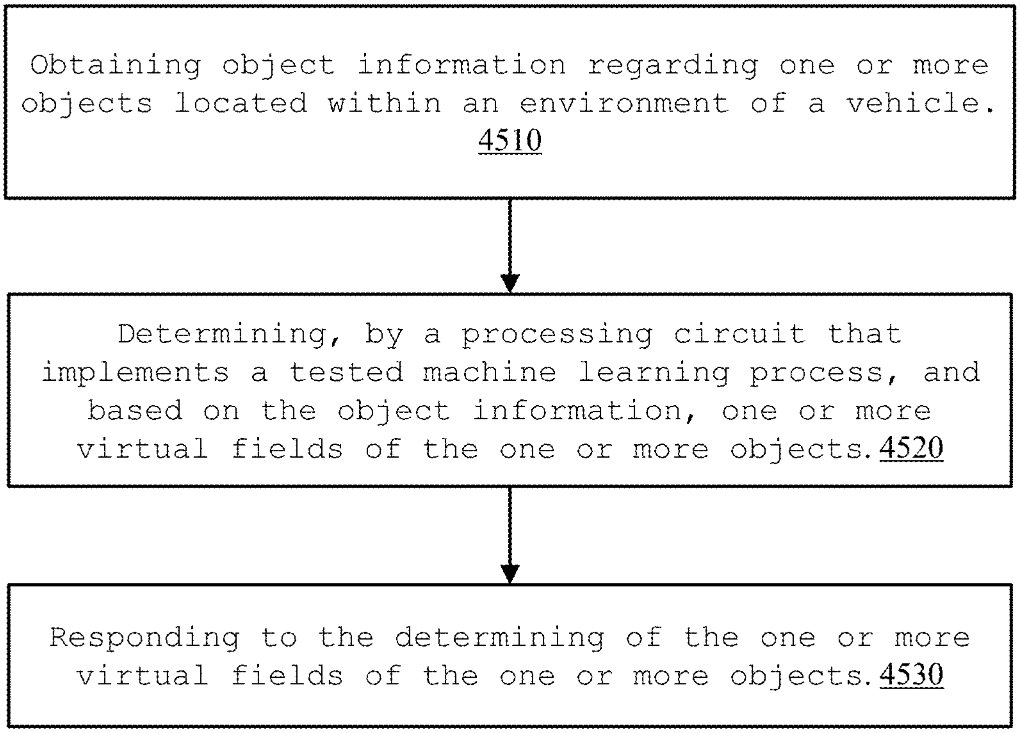
FIG. 25 illustrates an example of a method.

FIG. 25 illustrates an example of method 4500 for

According to an embodiment, method 4500 includes step 4510 of obtaining object information regarding one or more objects located within an environment of a vehicle.

According to an embodiment, step 4510 is followed by step 4520 of determining, by a processing circuit that implements a tested machine learning process, and based on the object information, one or more virtual fields of the one or more objects.

According to an embodiment, the tested machine learning process is tested and trained by either one of methods 4440, 4401 or 4402.

According to an embodiment, step 4520 is followed by step 4530 of responding to the determining of the one or more virtual fields of the one or more objects.

According to an embodiment, step 4530 includes at least one of:

a. Outputting information regarding the one or more virtual fields.
b. Storing information regarding the one or more virtual fields.
c. Providing an indication that information regarding the one or more virtual fields is available.
d. Determining, by the processing circuit, a desired virtual acceleration of the vehicle based on the one or more virtual fields.
e. Determining, by the processing circuit, a total virtual force applied on the vehicle, based on the one or more virtual fields.
f. Triggering or requesting an execution of driving related operations of the vehicle.
g. Determining to execute driving related operations of the vehicle.
h. Executing driving related operations of the vehicle.
i. Making available information about the one or more virtual fields for further processing of the information by another processing circuit to determine a desired virtual acceleration of the vehicle based on the one or more virtual fields.
j. Making available information about the one or more virtual fields for further processing of the information by another processing circuit to determine a total virtual force applied on the vehicle, based on the one or more virtual fields.
k. Performing or requesting or instructing a an execution of a navigation related decision or operation of the vehicle—other impacting the navigation of the vehicle in any other manner.

According to an embodiment, the virtual physical model is a mechanical model and the virtual fields are driven from acceleration of the objects.

According to an embodiment, the situations involve a closest in path vehicle (CIPV) that precedes the vehicle.

According to an embodiment, the machine learning process is an automatic cruise control (ACC) machine learning process.

Figure 26:
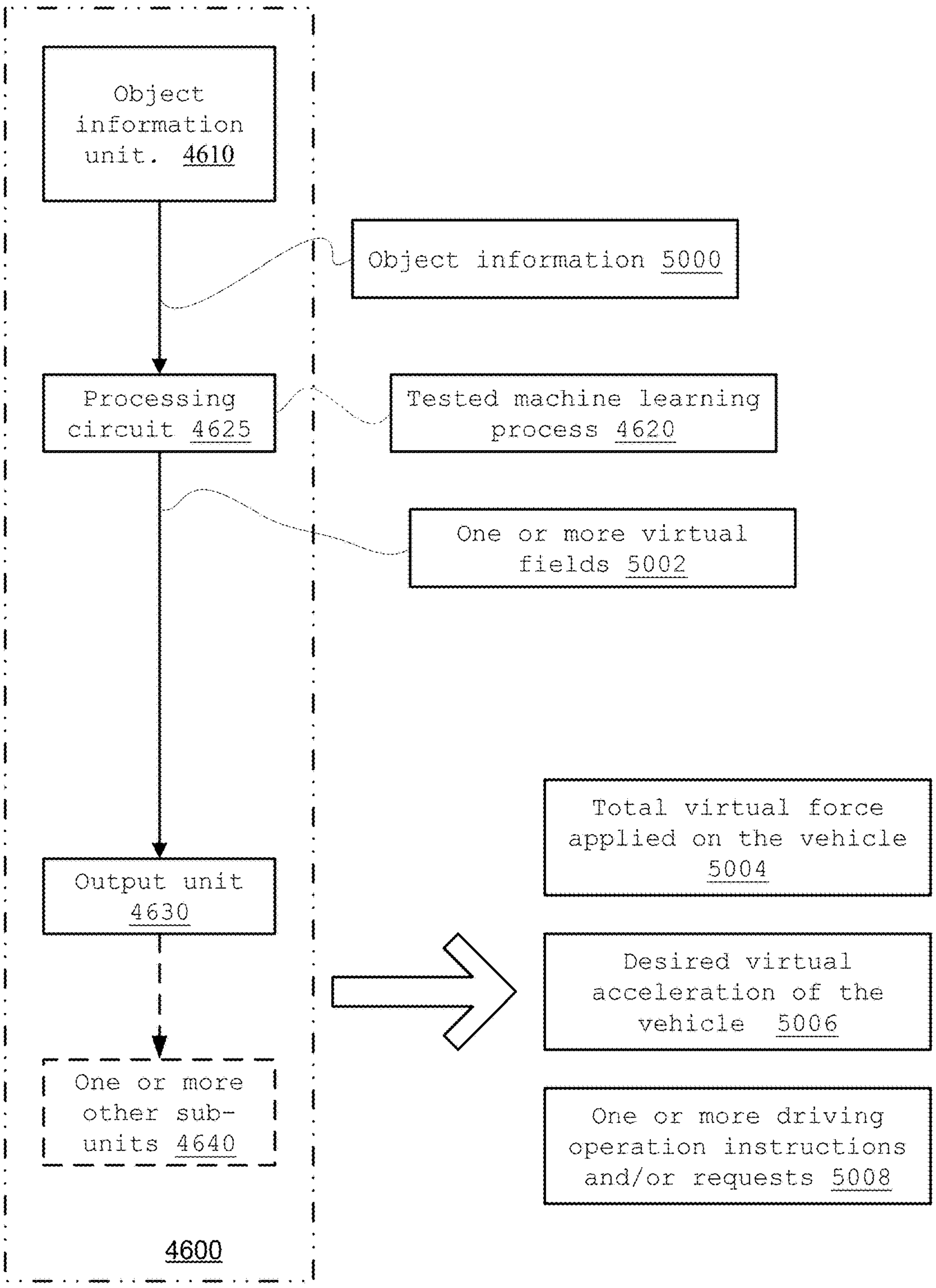
FIG. 26 illustrates an example of a unit and various information elements.

FIG. 26 illustrates an example of a unit 4600 for executing method 4500.

According to an embodiment, unit 4600 includes:

a. Object information unit 4610 that is configured to obtain object information regarding one or more objects located within an environment of a vehicle. The object information unit may be a communication unit, an input interface, a sensing unit for sensing the information, an image processor or an SIU processor, a memory unit, and the like.
b. A tested machine learning process 4620 that is configured to determine, based on the object information, one or more virtual fields of the one or more objects. The tested machine learning process may be implemented by a processing circuit 4625 that is configured execute instructions that perform the tested machine learning process. For simplicity of explanation FIG. 26 illustrated both tested machine learning process 4620 and processing circuit 4625.
c. Output unit 4630 for outputting and/or storing any information generated by the tested machine learning process 4620. The output unit may be a memory unit, a communication unit, and the like.

According to an embodiment, the tested machine learning process 4620 is further configured to determine at least one of:

a. A total virtual force applied on the vehicle, based on the one or more virtual fields.
b. A desired virtual acceleration of the vehicle based on the one or more virtual fields.
c. A driving related operation of the vehicle.

According to an embodiment, unit 4600 includes one or more other sub-units such as machine learning processes, neural networks, one or more other processing circuits (denoted 4640) that are configured to determine at least one of:

a. A total virtual force applied on the vehicle, based on the one or more virtual fields.
b. A desired virtual acceleration of the vehicle based on the one or more virtual fields.
c. A driving related operation of the vehicle.

According to an embodiment, the driving related operation of the vehicle is determined by another processing circuit—not part of unit 4600. The other processing circuit may be, for example, an autonomous driving unit of the vehicle and/or an ADAS driving unit of the vehicle.

FIG. 26 also illustrates object information 5000, information about (i) one or more virtual fields 5002, (ii) total virtual force applied on the vehicle 5004, (iii) desired acceleration of the vehicle 5006, (iv) one or more driving operation instructions and/or requests 5008. At least some are outputted from unit 4600.

According to an embodiment, memory unit such as memory unit 508 of FIG. 5 is configured to stores at least one of: object information 5000, information about (i) one or more virtual fields 5002, (ii) total virtual force applied on the vehicle 5004, (iii) desired acceleration of the vehicle 5006, (iv) one or more driving operation instructions and/or requests 5008.

Pixel to Virtual Fields

According to an embodiment, virtual fields are attributed to objects. Some virtual field processing circuits receive as input kinematic information about objects—and there is a need to be capable of receiving as input sensed information units.

There is provided a solution that either received spatial and temporal information extracted from SIUs or is able to perform the extraction of spatial and temporal information from SIUs.

Figure 27:
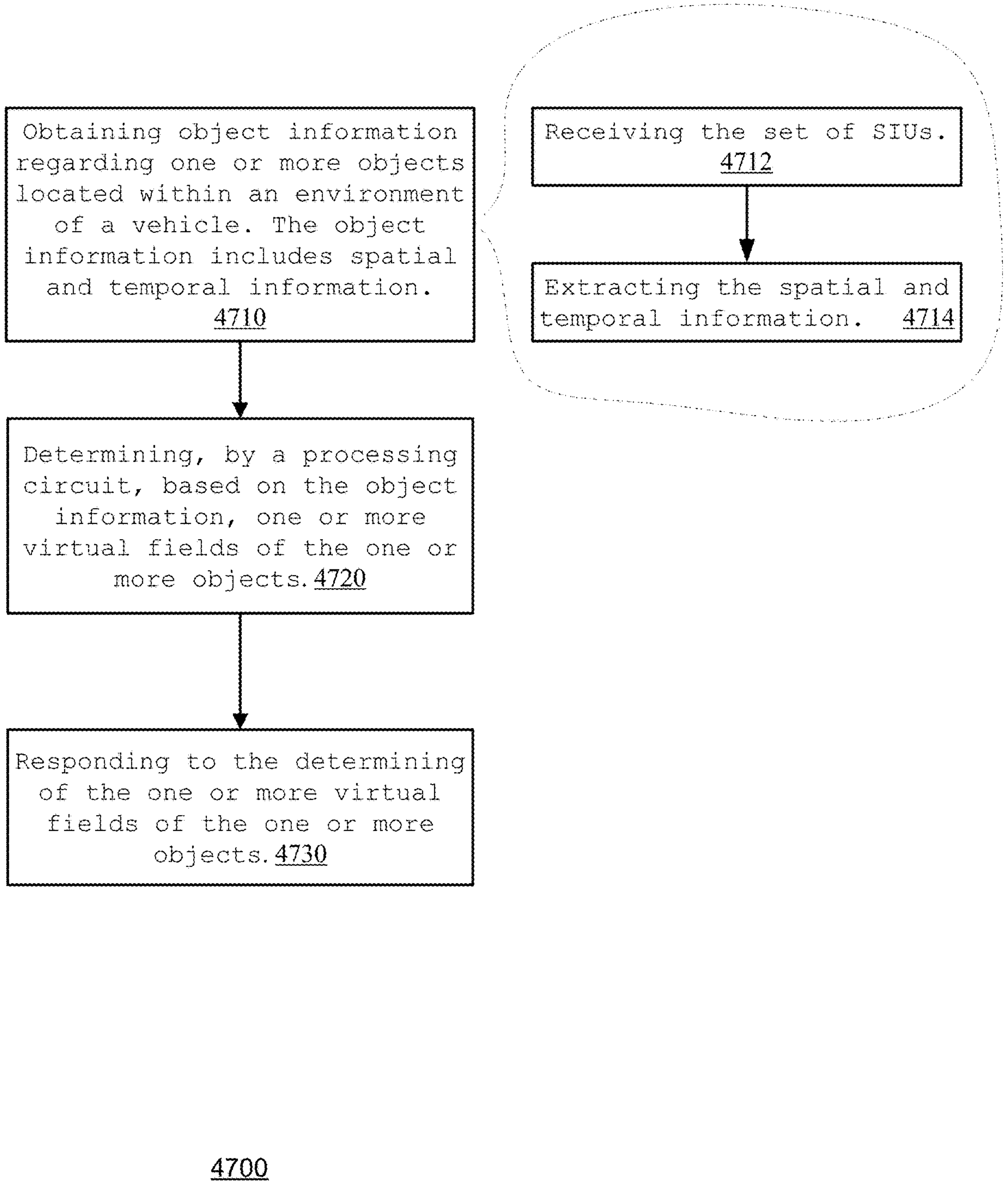
FIG. 27 illustrates an example of a method.

FIG. 27 illustrates an example of method 4700 of a method for augmented driving related virtual fields.

According to an embodiment, method 4700 includes step 4710 of obtaining object information regarding one or more objects located within an environment of a vehicle. The object information includes spatial and temporal information extracted from a set of sensed information units (SIUs) of the environment of the vehicle that were acquired at different points in time.

According to an embodiment the different points of time within a time period having a length of 1, 2, 3, 4, 5, 6, 7, 8 or 9 seconds, and the like, According to an embodiment, the time period exceed 10 seconds. The different points of time may be spaced from each other by a second or by a fraction of a second, although different spaces may be provided.

According to an embodiment, the spatial and temporal information provide information about a location of objects within the SIUs and movement (kinematics) of the objects within a time period that includes the different points in time.

According to an embodiment, the spatial information defines the borders of each object or which pixels in the SIUs are associated with each object.

According to an embodiment, the spatial and temporal information is extracted from the set of SIUs by a convolutional neural network (CNN).

According to an embodiment, the spatial and temporal information is extracted from the set of SIUs by a transformer neural network (TNN).

According to an embodiment, the spatial and temporal information is extracted from the set of SIUs by a panoptic segmentation model.

According to an embodiment, the spatial and temporal information is extracted from the set of SIUs by a segmentation and tracking module.

According to an embodiment, step 4710 includes step 4712 of receiving the set of SIUs, and step 4714 of extracting the spatial and temporal information from the set of SIUs.

According to an embodiment, step 4710 is followed by step 4720 of determining, by a processing circuit, and based on the object information, one or more virtual fields of the one or more objects, wherein the determining of the one or more virtual fields is based on a virtual physical model, wherein the one or more virtual fields represent a potential impact of the one or more objects on a behavior of the vehicle, wherein the virtual physical model is built based on one or more physical laws.

According to an embodiment, step 4720 is followed by step 4730 of responding to the determining of the one or more virtual fields of the one or more objects.

According to an embodiment, step 4530 includes at least one of:

a. Outputting information regarding the one or more virtual fields.
b. Storing information regarding the one or more virtual fields.
c. Providing an indication that information regarding the one or more virtual fields is available.
d. Determining, by the processing circuit, a desired virtual acceleration of the vehicle based on the one or more virtual fields.
e. Determining, by the processing circuit, a total virtual force applied on the vehicle, based on the one or more virtual fields.
f. Triggering or requesting an execution of driving related operations of the vehicle.
g. Determining to execute driving related operations of the vehicle.
h. Executing driving related operations of the vehicle.
i. Making available information about the one or more virtual fields for further processing of the information by another processing circuit to determine a desired virtual acceleration of the vehicle based on the one or more virtual fields.
j. Making available information about the one or more virtual fields for further processing of the information by another processing circuit to determine a total virtual force applied on the vehicle, based on the one or more virtual fields.
k. Performing or requesting or instructing a an execution of a navigation related decision or operation of the vehicle—other impacting the navigation of the vehicle in any other manner.

According to an embodiment, the virtual physical model represents objects as electromagnetic charges and the virtual fields are virtual electromagnetic fields.

According to an embodiment, the virtual physical model is a mechanical model and the virtual fields are driven from acceleration of the objects.

Figure 28:
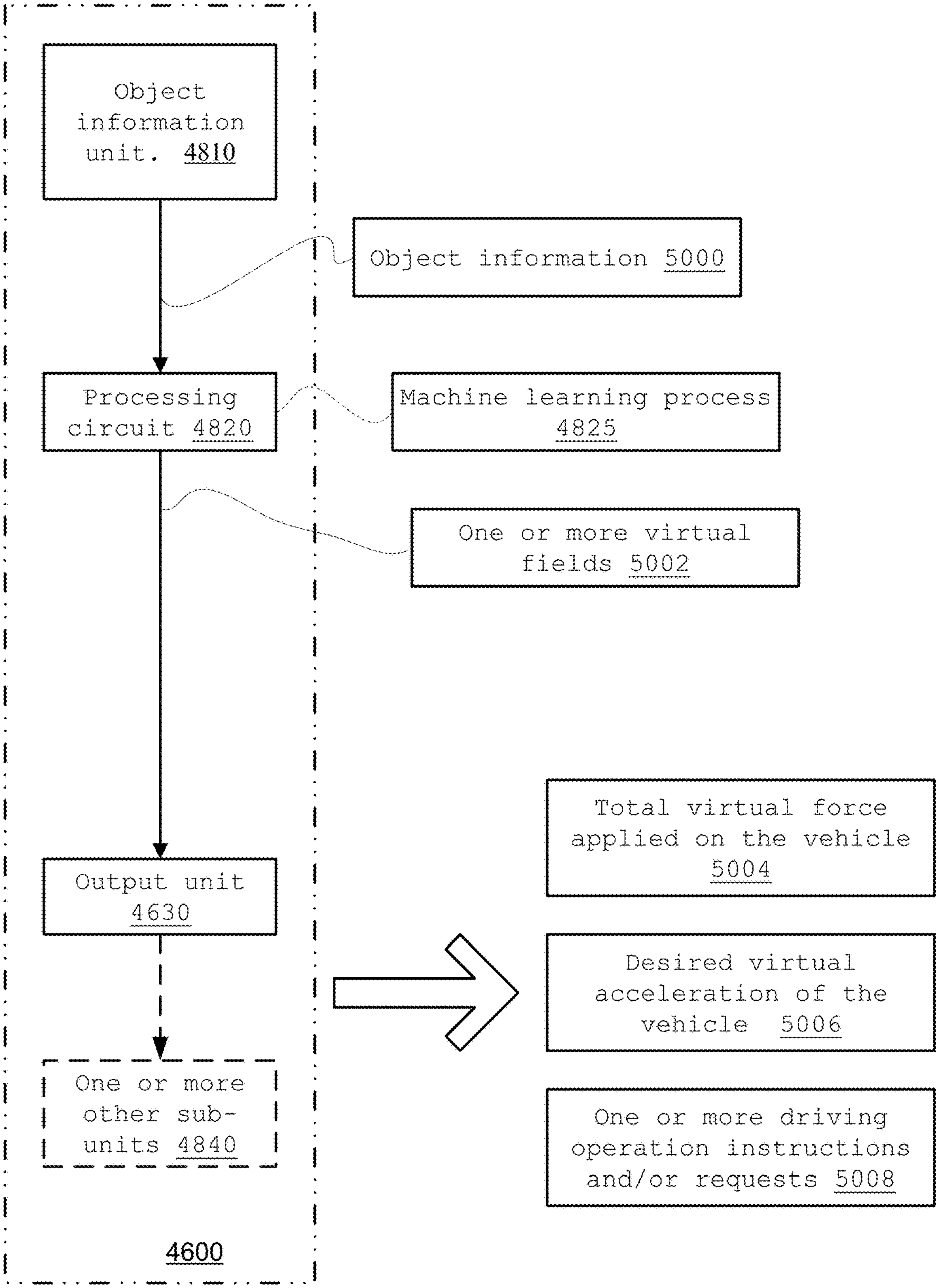
FIG. 28 illustrates an example of a unit and various information elements.

FIG. 28 illustrates an example of a unit 4800 for executing method 4700.

According to an embodiment, unit 4800 includes:

a. Object information unit 4810 that is configured to obtain object information regarding one or more objects located within an environment of a vehicle. The object information unit may be a communication unit, an input interface, a sensing unit for sensing the information, an image processor or an SIU processor, a memory unit, and the like. The object information includes spatial and temporal information extracted from a set of sensed information units (SIUs) of the environment of the vehicle that were acquired at different points in time.
b. A processing circuit 4820 that is configured to determine, based on the object information, one or more virtual fields of the one or more objects. The processing circuit 4820 may implement a machine learning process 4825. For simplicity of explanation FIG. 28 illustrated both machine learning process 4825 and processing circuit 4820.

c. Output unit 4830 for outputting and/or storing any information generated by the processing circuit. The output unit may be a memory unit, a communication unit, and the like.

According to an embodiment, the object information unit 4810 is configured to receive the set of SIUs and to extract the spatial and temporal information.

According to an embodiment, the spatial and temporal information is extracted from the set of SIUs by a convolutional neural network (CNN).

According to an embodiment, the spatial and temporal information is extracted from the set of SIUs by a transformer neural network (TNN).

According to an embodiment, the spatial and temporal information is extracted from the set of SIUs by a panoptic segmentation model.

According to an embodiment, the processing circuit 4820 is further configured to determine at least one of:

a. A total virtual force applied on the vehicle, based on the one or more virtual fields.

b. A desired virtual acceleration of the vehicle based on the one or more virtual fields.

c. A driving related operation of the vehicle.

According to an embodiment, unit 4800 includes one or more other sub-units (denoted 4845) that are configured to determine at least one of:

a. A total virtual force applied on the vehicle, based on the one or more virtual fields.

b. A desired virtual acceleration of the vehicle based on the one or more virtual fields.

c. A driving related operation of the vehicle.

According to an embodiment, the driving related operation of the vehicle is determined by another processing circuit—not part of unit 4800. The other processing circuit may be, for example, an autonomous driving unit of the vehicle and/or an ADAS driving unit of the vehicle.

FIG. 28 also illustrates object information 5000, information about (i) one or more virtual fields 5002, (ii) total virtual force applied on the vehicle 5004, (iii) desired acceleration of the vehicle 5006, (iv) one or more driving operation instructions and/or requests 5008. At least some are outputted from unit 4600.

Figure 29:
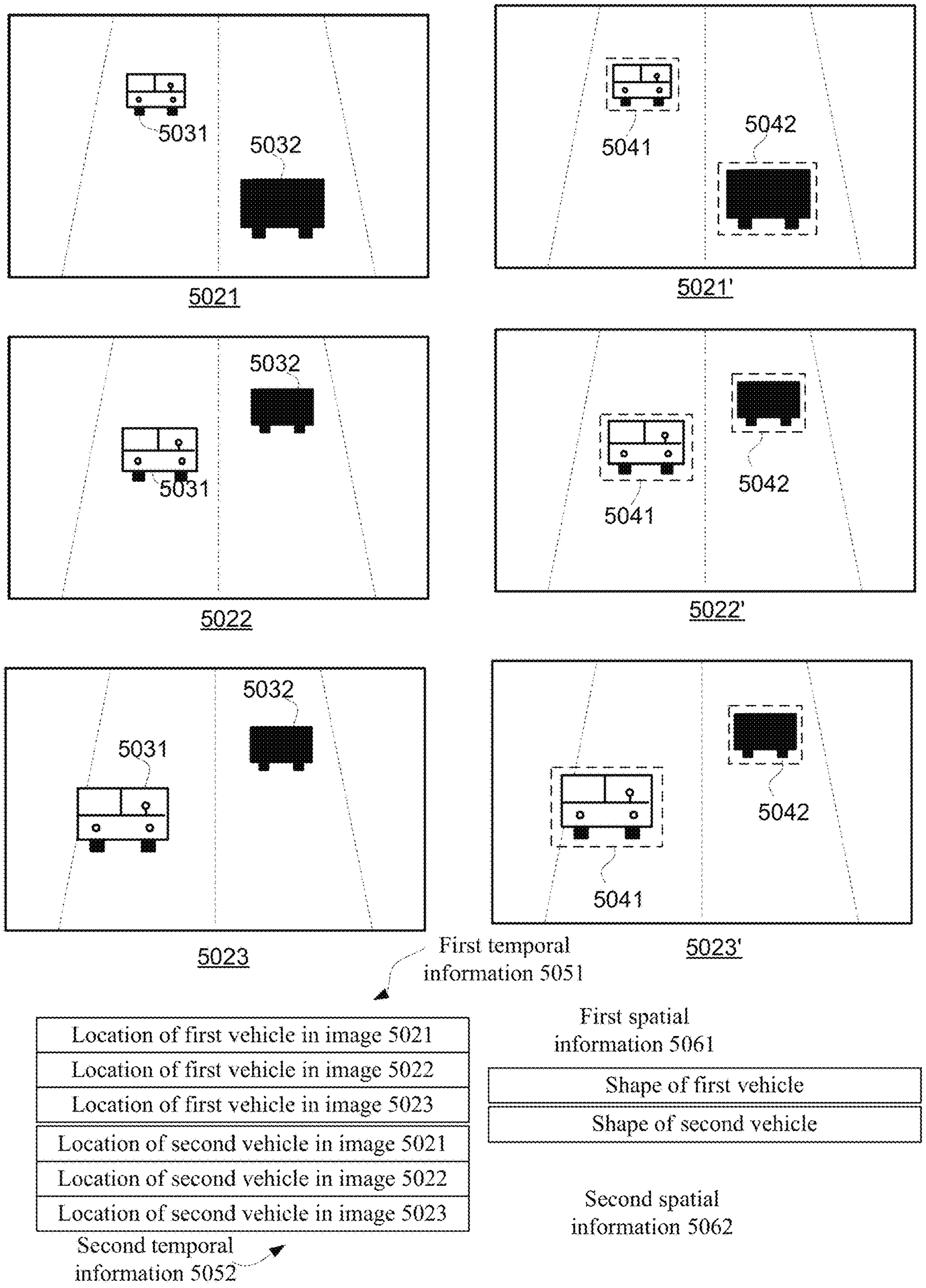
FIG. 29 illustrates examples of images and spatial and temporal information.

FIG. 29 illustrates an example of multiple images 5021, 5022 and 5023 of an environment of a first vehicle 5031 and a second vehicle 5032, and information such as bounding shapes 5041 and 5042 within images 5021'. 5022' and 5023' indicative of shapes of the vehicles. For simplicity of explanation the bounding shapes are a bit distant from the vehicles.

FIG. 29 also illustrates another example of spatial information—first spatial information 5061 indicative of the shape of the first vehicle, and second spatial information 5062 indicative of the shape of the second vehicle.

First temporal information 5051 indicates the movement of the first vehicle. For example—direction and/or amount of movement during the different points in time.

Second temporal information 5052 indicates the movement of the second vehicle.

According to an embodiment, the temporal information is expressed in any other manner and the spatial information is expressed in any other manner.

In the foregoing specification, the invention has been described with reference to specific examples of embodiments of the invention. It will, however, be evident that various modifications and changes may be made therein without departing from the broader spirit and scope of the invention as set forth in the appended claims. Moreover, the terms “front,” “back,” “top,” “bottom,” “over,” “under” and the like in the description and in the claims, if any, are used for descriptive purposes and not necessarily for describing permanent relative positions.

It is understood that the terms so used are interchangeable under appropriate circumstances such that the embodiments of the invention described herein are, for example, capable of operation in other orientations than those illustrated or otherwise described herein. Furthermore, the terms “assert” or “set” and “negate” (or “deassert” or “clear”) are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality. Any arrangement of components to achieve the same functionality is effectively “associated” such that the desired functionality is achieved.

Hence, any two components herein combined to achieve a particular functionality may be seen as “associated with” each other such that the desired functionality is achieved, irrespective of architectures or intermedial components. Likewise, any two components so associated can also be viewed as being “operably connected,” or “operably coupled,” to each other to achieve the desired functionality. Furthermore, those skilled in the art will recognize that boundaries between the above described operations are merely illustrative. The multiple operations may be combined into a single operation, a single operation may be distributed in additional operations and operations may be executed at least partially overlapping in time.

Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word ‘comprising’ does not exclude the presence of other elements or steps then those listed in a claim.

Furthermore, the terms “a” or “an,” as used herein, are defined as one or more than one. Also, the use of introductory phrases such as “at least one” and “one or more” in the claims should not be construed to imply that the introduction of another claim element by the indefinite articles “a” or “an” limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage. While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination. It will be appreciated by people skilled in the art that the embodiments of the disclosure are not limited by what has been particularly shown and described hereinabove. Rather the scope of the embodiments of the disclosure is defined by the appended claims and equivalents thereof.

What is claimed is:

1. A method that is computer implemented and is for training and testing a machine learning process, the method comprises:

learning virtual fields based on simulations of behaviors of a vehicle when faced with situations involving objects within environments of the vehicle, the virtual fields represent potential impacts of objects on the behaviors of the vehicle, wherein the learning is based on a virtual physical mode;

training the machine learning process to generate the virtual fields by applying a training process that uses outcomes of the simulations to provide a trained machine learning process; and testing the trained machine learning process by feeding the trained machine learning process with other situations to provide test results.

2. The method according to claim 1, wherein the virtual physical model represents objects as electromagnetic charges and the virtual fields are virtual electromagnetic fields.

3. The method according to claim 1, wherein the virtual physical model is a mechanical model and the virtual fields are driven from acceleration of the objects.

4. The method according to claim 1, wherein the situations involve a closest in path vehicle (CIPV) that precedes the vehicle.

5. The method according to claim 1, wherein the machine learning process is an automatic cruise control (ACC) machine learning process.

6. The method according to claim 1, comprising retraining the trained machine learning process when the trained machine learning process failed the testing.

7. The method according to claim 6, comprising utilizing one or more of the other situations during the retraining.

8. The method according to claim 1, further comprising training the machine learning process to determine a desired virtual acceleration of the vehicle based on the one or more virtual fields.

9. The method according to claim 1, further comprising training the machine learning process to determine a total virtual force applied on the vehicle, based on the one or more virtual fields.

10. A non-transitory computer readable medium storing instructions that, when executed by at least one processor, cause the at least one processor to perform operations for training and testing a machine learning process, comprising:

learning virtual fields based on simulations of behaviors of a vehicle when faced with situations involving objects within environments of the vehicle, the virtual fields represent potential impacts of objects on the behaviors of the vehicle, wherein the learning is based on a virtual physical mode;

training the machine learning process to generate the virtual fields by applying a training process that uses outcomes of the simulations to provide a trained machine learning process; and testing the trained machine learning process by feeding the trained machine learning process with other situations to provide test results.

11. A method that is computer implemented and is for navigation, the method comprises:

obtaining object information regarding one or more objects located within an environment of a vehicle;

determining, by a processing circuit that implements a tested machine learning process, and based on the object information, one or more virtual fields of the one or more objects;

wherein the tested machine learning process was trained and tested by:

learning virtual fields based on simulations of behaviors of a vehicle when faced with situations involving objects within environments of the vehicle, the virtual fields represent potential impacts of objects on the behaviors of the vehicle, wherein the learning is based on a virtual physical mode;

training a machine learning process to generate the virtual fields by applying a training process that uses outcomes of the simulations to provide a trained machine learning process; and testing the trained machine learning process by feeding the trained machine learning process with other situations to provide test results, to provide the tested machine learning process.

12. The method according to claim 11, comprising determining, by the processing circuit, a desired virtual acceleration of the vehicle based on the one or more virtual fields.

13. The method according to claim 12, wherein the determining of the desired virtual acceleration of the vehicle triggering executing of driving related operations of the vehicle.

14. The method according to claim 12, wherein the determining of the desired virtual acceleration of the vehicle is followed by executing of driving related operations of the vehicle.

15. The method according to claim 11, comprising determining, by the processing circuit, a total virtual force applied on the vehicle, based on the one or more virtual fields.

16. The method according to claim 11, wherein the determining of the one or more virtual fields triggering executing of further processing of the one or more virtual fields to impact a navigation of the vehicle.

17. The method according to claim 11, wherein the virtual physical model is a mechanical model and the virtual fields are driven from acceleration of the objects.

18. The method according to claim 11, wherein the situations involve a closest in path vehicle (CIPV) that precedes the vehicle.

19. The method according to claim 11, wherein the machine learning process is an automatic cruise control (ACC) machine learning process.

20. The method according to claim 19, wherein the determining of the one or more virtual fields triggering executing of an ACC operation.

* * * * *